(12) United States Patent
Potharaju et al.

(10) Patent No.: US 11,288,271 B2
(45) Date of Patent: Mar. 29, 2022

(54) DATA LAKE WORKLOAD OPTIMIZATION THROUGH EXPLAINING AND OPTIMIZING INDEX RECOMMENDATIONS

(71) Applicant: Microsoft Technology Licensing, LLC, Redmond, WA (US)

(72) Inventors: Rahul Potharaju, Redmond, WA (US); Wentao Wu, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 2 days.

(21) Appl. No.: 16/885,878

(22) Filed: May 28, 2020

(65) Prior Publication Data
US 2021/0382897 A1 Dec. 9, 2021

(51) Int. Cl.
*G06F 16/2453* (2019.01)
*G06F 16/901* (2019.01)
*G06F 16/2458* (2019.01)

(52) U.S. Cl.
CPC .... *G06F 16/24545* (2019.01); *G06F 16/2471* (2019.01); *G06F 16/9024* (2019.01)

(58) Field of Classification Search
CPC .......... G06F 16/24545; G06F 16/2471; G06F 16/9024
See application file for complete search history.

(56) References Cited

U.S. PATENT DOCUMENTS

| 6,266,658 | B1 | 7/2001 | Adya et al. |
| 6,356,890 | B1 | 3/2002 | Agrawal et al. |
| 2005/0203940 | A1 | 9/2005 | Farrar et al. |
| 2013/0080441 | A1* | 3/2013 | Abou ............ G06F 16/81 707/741 |
| 2018/0107714 | A1* | 4/2018 | Tariq ............ G06F 16/2228 |

(Continued)

OTHER PUBLICATIONS

Gibas, et al., "Online Index Recommendations for High-Dimensional Databases Using Query Workloads", In IEEE Transactions on Knowledge and Data Engineering, vol. 20, Issue 2, Feb. 1, 2008, pp. 246-260.

(Continued)

*Primary Examiner* — Dangelino N Gortayo
(74) *Attorney, Agent, or Firm* — Fiala & Weaver P.L.L.C.

(57) ABSTRACT

Methods, systems and computer program products are described herein that enable data workload optimization through "what-if" modeling of indexes and index recommendation. In an example aspect, a system is configured to accept a workload comprising a plurality of queries directed at data having a first physical data layout, generate a set of candidate indexes based on the plurality of queries, enumerate index configurations based of the set of candidate indexes, each index configuration comprising a subset on the set of candidate indexes, generate a hierarchical graph of the index configurations, search the hierarchical graph for a recommended index configuration comprising an index configuration with the lowest estimated cost while pruning index configurations not considered from the graph of index configurations to generate a pruned graph, execute a graph query against the pruned graph generating a graph query result and perform an optimization operation based on the graph query result.

20 Claims, 19 Drawing Sheets

(56) References Cited

U.S. PATENT DOCUMENTS

| | | | |
|---|---|---|---|
| 2018/0210966 A1* | 7/2018 | Bedi | G06F 16/9024 |
| 2019/0220464 A1* | 7/2019 | Butani | G06F 16/283 |
| 2020/0278966 A1* | 9/2020 | Al-Omari | G06F 16/24542 |
| 2021/0117425 A1* | 4/2021 | Rao | H04L 43/028 |
| 2021/0224675 A1* | 7/2021 | P. | G06F 16/217 |

OTHER PUBLICATIONS

"International Search Report and Written Opinion Issued in PCT Application No. PCT/US21/026745", dated Jul. 13, 2021, 11 Pages.

\* cited by examiner

```
1   // Index Maintenance
2   createIndex(df: DataFrame,
3               indexCfg: IndexConfig): Unit
4   deleteIndex(indexName: String): Unit
5   restoreIndex(indexName: String): Unit
6   vacuumIndex(indexName: String): Unit
7   rebuildIndex(indexName: String): Unit
8   cancel(indexName: String): Unit
9
10  // Debugging and Recommendation
11  explain(df: DataFrame): Unit
12  whatIf(workload: Array[DataFrame],
13         indexCfg: IndexConfig): Cost
14  recommend(query: Array[DataFrame],
15            options: RecOptions): Recommendation
16
17  // Configuration for Storage & Query Optimizer
18  indexing_subsystem.system.path
19  indexing_subsystem.creation.[path | namespace]
20  indexing_subsystem.search.[path | namespace]
21  indexing_subsystem.search.disablePublicIndexes
```

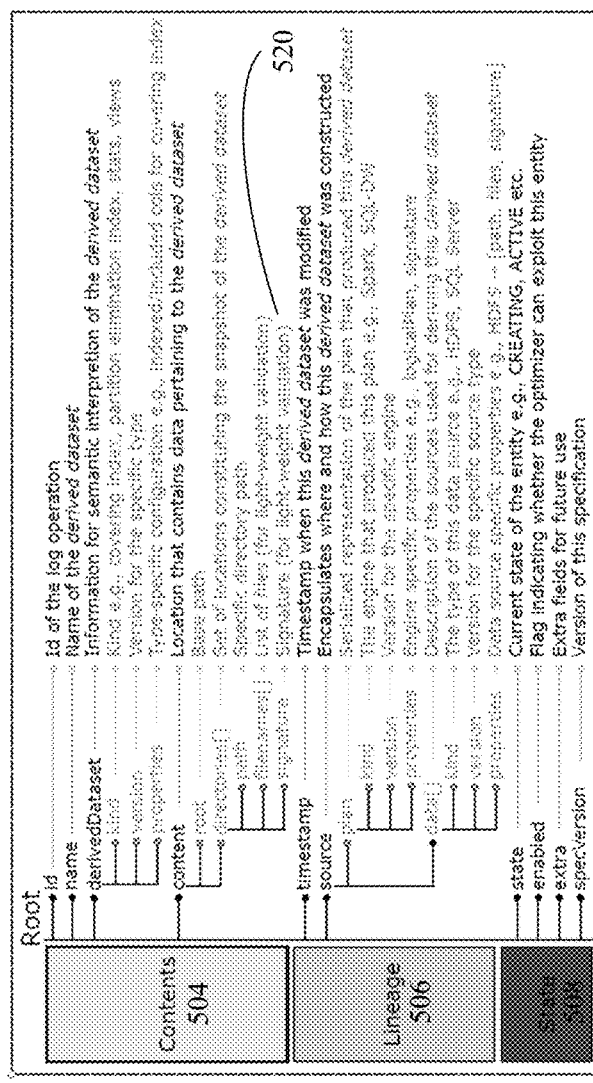
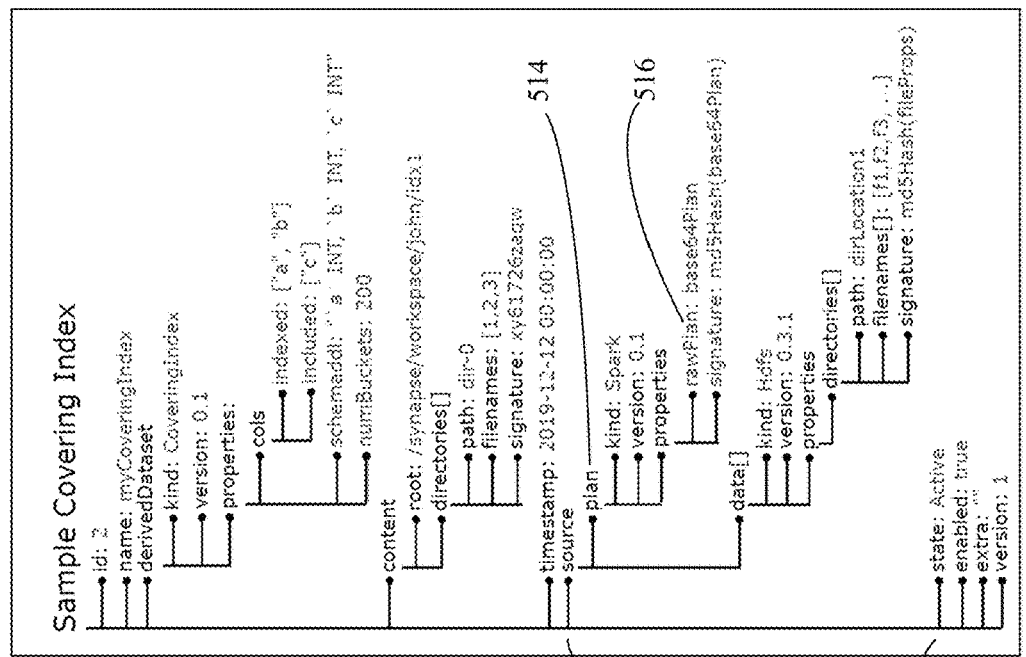
FIG. 5A
FIG. 5B

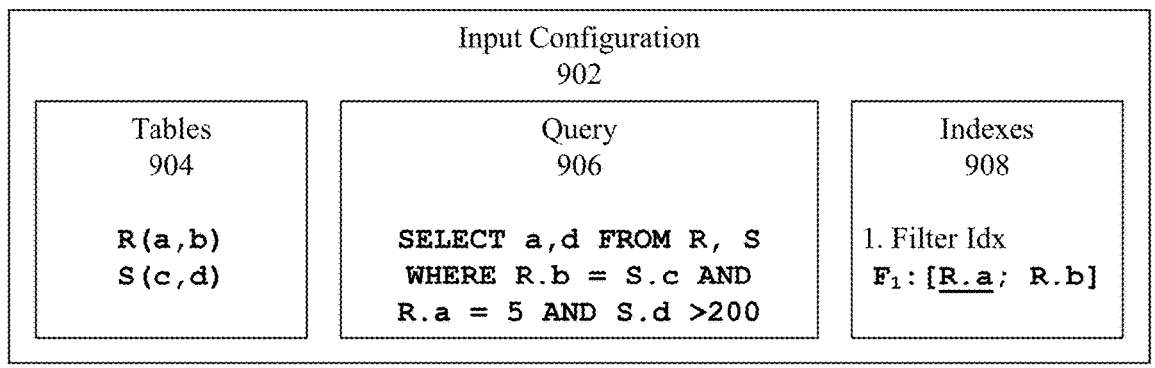
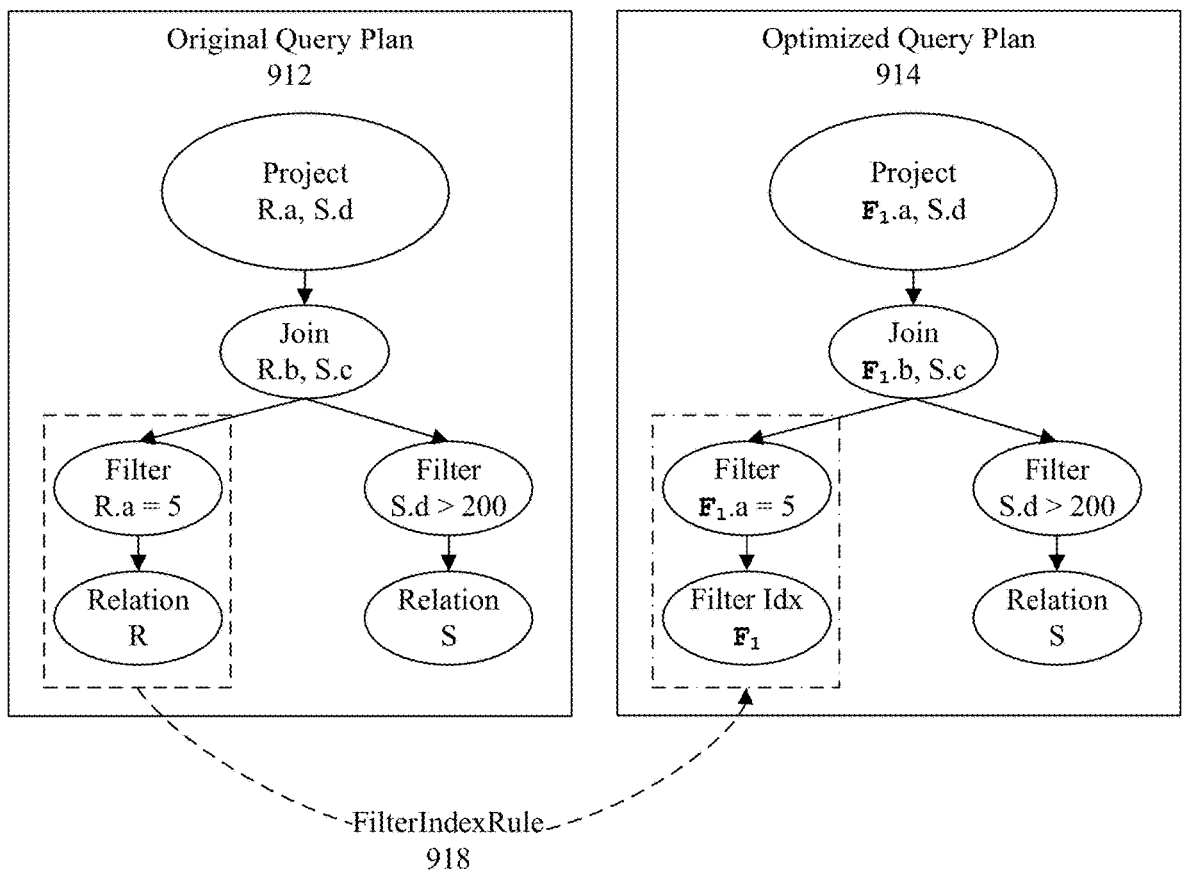
FIG. 9

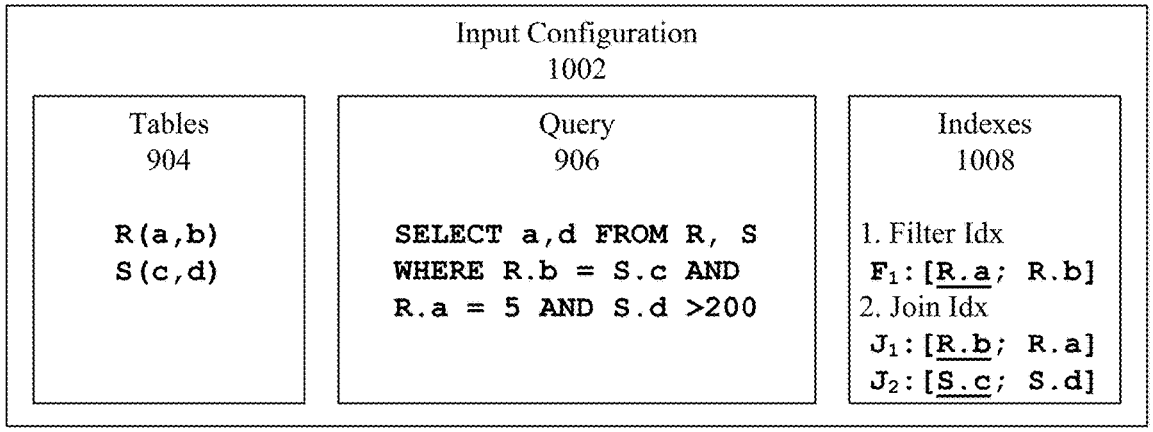
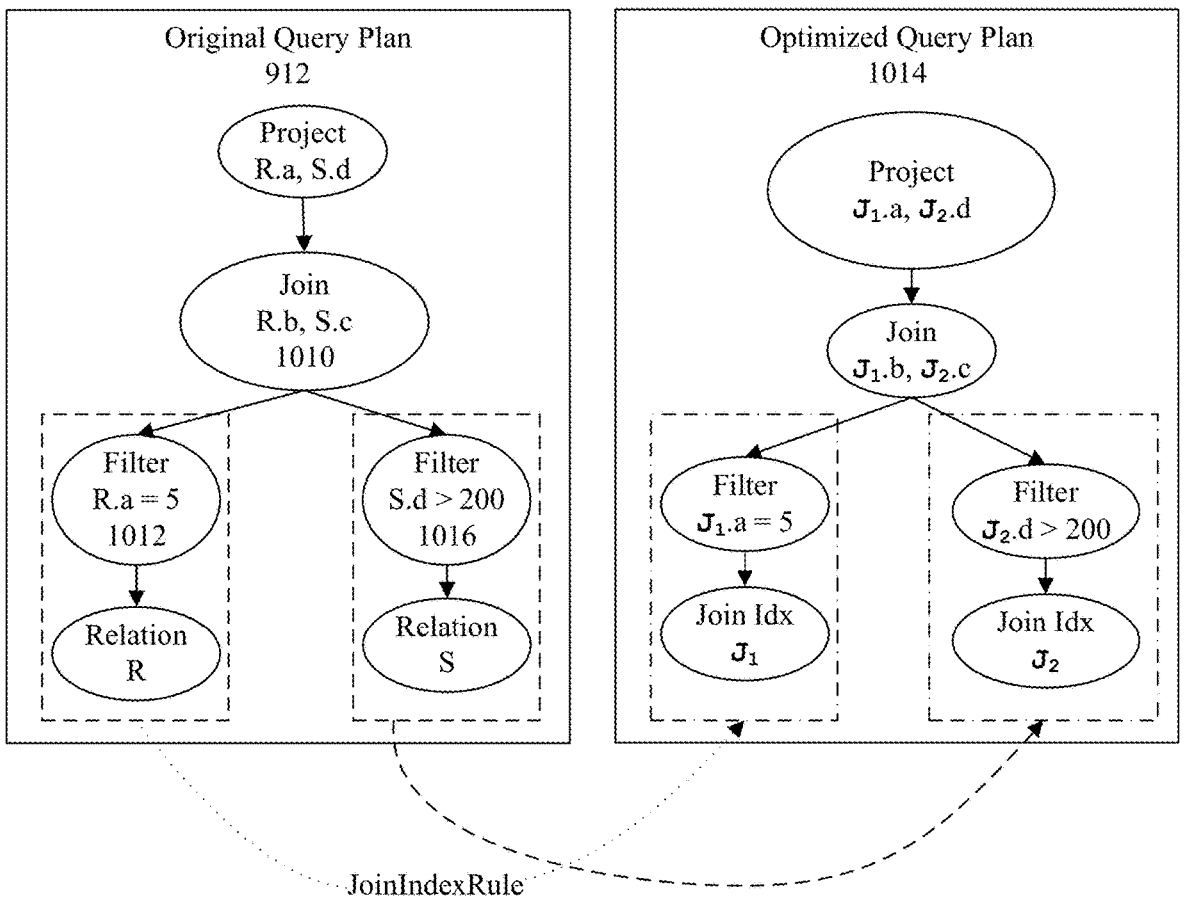
FIG. 10

DATA LAKE WORKLOAD OPTIMIZATION THROUGH EXPLAINING AND OPTIMIZING INDEX RECOMMENDATIONS

BACKGROUND

The amount of raw data in all forms generated by business organizations, science researchers and the like may be quite large, on the order of hundreds of petabytes. Modern systems often gather and generate data at a rate many times greater than such data can be usefully categorized and managed. Data lakes have seen increasing adoption in such instances. A "data lake" is data storage platform configured to store such quantities of raw data in native form whether structured or unstructured. The vast scale of a data lake, along with the oftentimes unstructured nature of the data, may make it difficult to make productive use of all the information that may be gleaned from the data.

A "data warehouse", on the other hand, typically houses structured or processed data that may be more easily manipulated for various business intelligence or research needs. A data warehouse does not, however, have nearly the same scale as a data lake, and the retrievable information may therefore be more limiting.

The overall trend, however, has been toward convergence of lakes and warehouses. For example, data warehouse offerings are increasingly offering enhanced capabilities in data diversity and scale to approach capabilities of data lakes. Data lake offerings are showing the emergence of support in data lakes for efficiently updatable and versioned relational data with change tracking, and competitive relational query capabilities at very large scale. Likewise, data lake offerings are increasingly providing support for relational tool chains for reporting, data orchestration, security, sharing, compliance, and governance.

There historically has been a huge demand for indexing support from traditional data warehouse systems to be provided on data lake systems. Though there are many ways to improve query performance in database systems, indexes are particularly efficient in providing tremendous acceleration for certain workloads because they can reduce the amount of data retrieved for a given query. However, providing indexing solutions in the context of distributed database systems and/or cloud-based architectures presents some challenges. For example, a key driver of the adoption of cloud-based models is the flexibility to store and subsequently query data using any query engine. Unfortunately, disparate query engines typically cannot use common indexes.

Another common problem arises when an index recommendation engine produces suboptimal recommendations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are described herein that enable data workload optimization through "what-if" modeling of indexes and index recommendation, and thereafter exploring the index recommendation search space to enable further optimization. In an example aspect, a system is configured to accept a workload in the form of a plurality of data queries, generate a set of candidate indexes based on the plurality of queries, enumerate index configurations based of the set of candidate indexes, each index configuration comprising a subset on the set of candidate indexes, generate a hierarchical graph of the index configurations, search the hierarchical graph for a recommended index configuration comprising an index configuration with a lowest estimated cost while pruning index configurations not considered from the graph of index configurations to generate a pruned graph, executing a graph query against the pruned graph generating a graph query result, and performing an optimization operation based on the graph query result. Furthermore, the system may receive a query, generate a query plan for the query configured to use one or more of the built candidate indexes, and execute the query plan to generate a query result.

In a further example aspect, optimization operations may be determined via graph queries executed against the pruned graph, wherein graph queries may comprise graph neighborhood queries, graph path queries, ranking queries and/or filtering queries.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 depicts example data lake indexing and query system application programming interfaces (APIs), according to an embodiment.

FIG. 5A depicts an example index metadata specification, according to an embodiment.

FIG. 5B depicts an example instance of a covering index described according to the example index metadata specification of FIG. 5A, according to an embodiment.

FIG. 9 depicts an example application of a Filter index Rule to a SQL query, according to an embodiment.

FIG. 10 depicts an example application of a Join index Rule to a SQL query, according to an embodiment.

Figure 1:
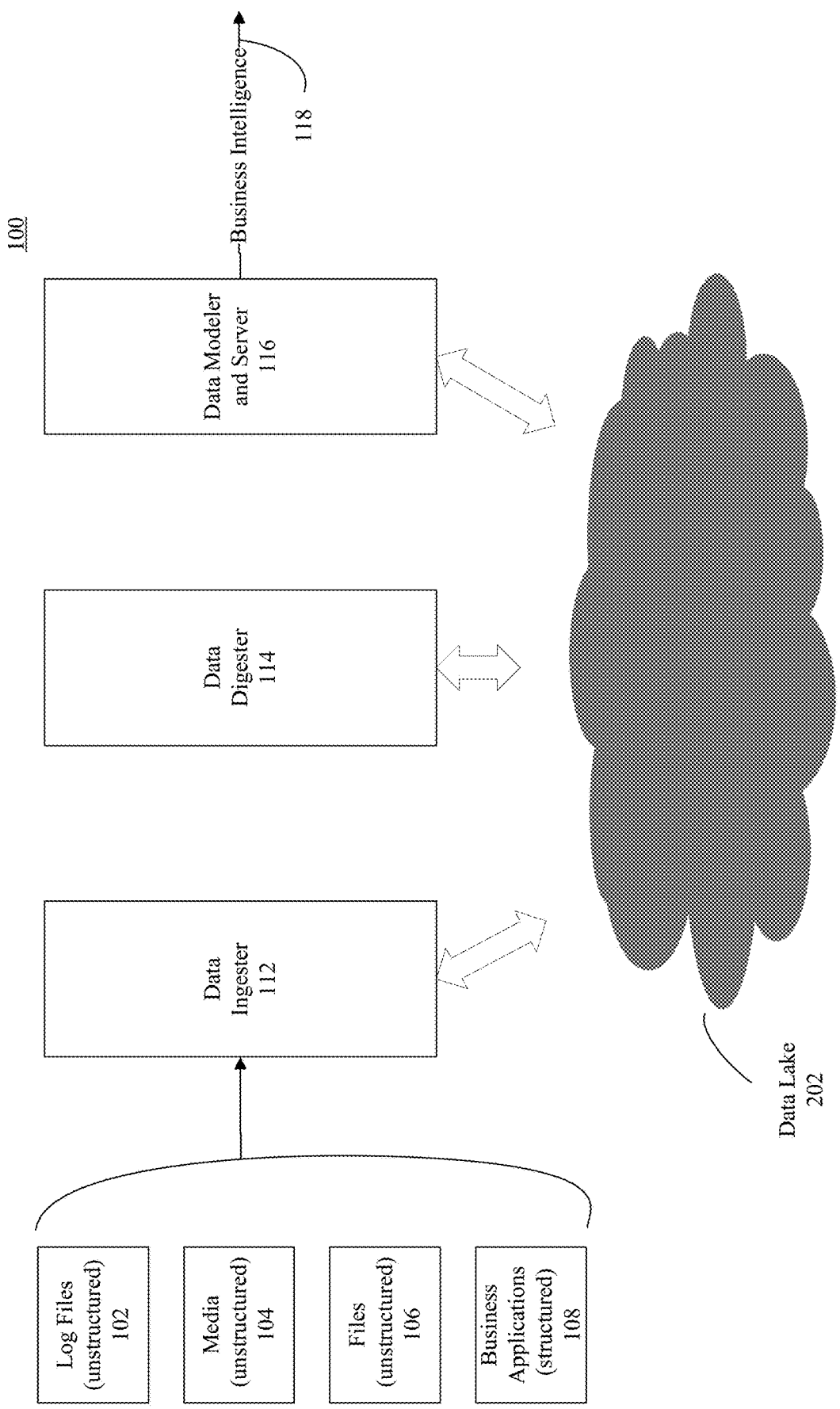
FIG. 1 depicts an example data lake system, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments disclosed herein bring multi-engine interoperability to data lakes, and may include guided, semi-guided, or automatic index selections to allow users to optimize their workloads. Moreover, to lower operational costs, to further enable multi-engine interoperability while also enabling multi-user concurrency, embodiments disclosed herein embody a "serverless" index management strategy. In this section, we present an overview of the operating environment of the disclosed embodiments as depicted in FIG. 1.

FIG. 1 depicts an example data lake system 100, according to an embodiment. Data lake system 100 is depicted to include generalized components dedicated to various high-level functions. Data lake system 100 includes a data ingester 112, a data digester 114, and a data modeler and server 116. Data lake system 100 further includes a data lake 110 that interfaces with data ingester 112, data digester 114, and data modeler and server 116, and enables data to be written or read thereby to and from data lake 110.

Conceptually, data ingester 112 is configured to accept structured or unstructured data and store such data in data lake 110. Such data may include, for example, log files 102 (unstructured), media 104 (unstructured), files 106 (unstructured), and/or business applications 108 including any underlying schema (structured). Note, such data categories are merely exemplary. A data lake such as data lake 110 is typically configured to accept and store any type of data in its native format. Through data ingester 112, data lake 110 may come to be populated with huge amounts of data ranging into the hundreds of petabytes or even more.

Making productive use of such huge amounts of data may be enabled through the combined operations of data digester 114 and data modeler and server 116. In embodiments, data digester 114 is configured to process the unstructured data on data lake 110 to provide a structured or semi-structured and curated view of at least some of the data contained therein. Such views may thereafter be leveraged by data modeler and server 116 for various purposes including producing business intelligence 118, or other useful outputs. Essentially, data modeler and server 116 may be configured to operate in a manner analogous to conventional data warehouses, but over the entire data lake as processed by data digester 114.

Embodiments described herein may be implemented in various ways. For example, embodiments may be implemented in/on data modeler and server 116 to provide a data lake indexing and query system. However, other structural and operational embodiments will be apparent to persons skilled in the relevant art(s).

Further embodiments are described as follows along with motivating advantages in light of example APIs. Additionally, auxiliary data structures provided by embodiments are also described. The workload optimization embodiments disclosed herein may be implemented in conjunction with and operate using a number of different query engines. In the context of this disclosure, however, embodiments are described in terms of Apache Spark. One skilled in the art will appreciate, however, that Apache Spark is a mere example query engine and is not a necessary component of any embodiment. Other types of query engines may be present.

Embodiments of the indexing system described herein may include one or more of the following advantages:

1: Agnostic to data format. To support the most diverse scenarios, the indexing subsystem should be able to index data stored in the lake in any format, including text data (e.g., CSV, JSON, Parquet, ORC, Avro, etc.) and binary data (e.g., videos, audios, images, etc.). Moreover, the data is considered as externally managed, i.e., control over the lifecycle of the datasets is NOT assumed.

2: Low-cost index metadata management. To avoid burdening the query optimizer and the end-user, index metadata should be light-weight, fast to retrieve, and operate independent of a third-party catalog. In other words, the indexing subsystem should only depend on the data lake for its operation and should not assume the presence of any other service to operate correctly.

3: Multi-engine interoperability. The indexing subsystem should make third-party engine integration easy. To achieve this, embodiments expose (a) index state management and (b) index metadata in as transparent a way as possible.

4: Simple and guided user experience. The indexing subsystem should support diverse users including data scientists, data engineers, and data enthusiasts. Therefore, it should offer the simplest possible experience.

5: Extensible indexing. Because it is often impractical to provide all possible auxiliary data structures that aid in query acceleration, our indexing subsystem should offer mechanisms for easy pluggability of newer auxiliary data structures (related to indexing).

6: Security, Privacy, and Compliance. Because auxiliary structures such as indexes, views, and statistics copy the original dataset either partly or in full, the indexing subsystem should meet the necessary security, privacy, and compliance standards.

These advantages, particularly multi-engine interoperability, are furthered by reconsidering indexes as "derived datasets." While indexes were traditionally built and maintained as auxiliary data structures internal to a database management system ("DBMS"), in a data lake, because there is no single "database system," embodiments described herein treat indexes as a form of derived data—data that has been derived from one or more datasets and may be optionally used by an arbitrary query optimizer to improve the speed of data retrieval. Treating indexes as derived datasets may have very few basic assumptions: (1) that such derived datasets support basic lifecycle operations such as create, delete, (either full or incremental) rebuild, and restore, and (2) they can be leveraged for query acceleration (in particular, be readily leverage by and/or integrated into with query optimizers and execution runtimes). Therefore, embodiments support virtually any type of index including, for example, covering indexes, zone maps, materialized views, statistics, and chunk-elimination indexes. Accordingly, each of the enumerated examples herein above are properly considered when the term "index" is used herein below, but "index" may also include any other type of derived dataset that satisfies the above described assumptions. However, for the sake of context and completeness, a few examples of derived datasets are described as follows.

Covering index. Covering indexes are efficient in scenarios where certain selection and filter columns co-occur frequently in queries. They have the following properties:

1. Non-clustered—index is separated from the data.
2. Covering—index contains both key columns (i.e., "indexed columns" as the term is used herein below) and data/payload columns (i.e., "included columns" also as the term is used herein below); these data/payload columns are duplicated from the original data (for "index only" query access paths).
3. Columnar—index is stored in some columnar format (e.g., Parquet) rather than a row-oriented format such as a B-tree. This allows leveraging techniques such as vectorization along with min-max pruning to accelerate scans over indexes.

With all columns in the query being included in the covering index either as key or non-key columns, query performance can be significantly improved. Additional physical layout properties (such as bucketization, partitioning, and sort order) can speed up workhorse operators such as filter and join that typically dominate query execution time. In embodiments, all columns marked as "indexed columns" by the user may be bucketized and (optionally) sorted.

Chunk-Elimination index. For queries that are highly selective (e.g., searching for a single GUID amongst billions), a class of indexes called "chunk-elimination indexes" may be advantageously employed. Chunk-elimination indexes are analogous to a traditional inverted index, except that the pointer is an arbitrary URI (as opposed to a row_id) that refers to a chunk, a reasonable unit of addressable data stored in data lake (e.g., a single Parquet file or an offset range within a large CSV file). An optimizer can leverage this index to quickly prune irrelevant blocks for a query.

Materialized Views. For expensive queries with joins or aggregations, materialized views may be created as derived datasets. These materialized views can then be used transparently by the underlying query optimizer.

Statistics. In environments with cost-based query optimizers, embodiments may enable collection of statistics (e.g., histograms) a priori for columns of interest. A capable optimizer can then leverage these statistics at runtime to optimize resources.

Figure 2:
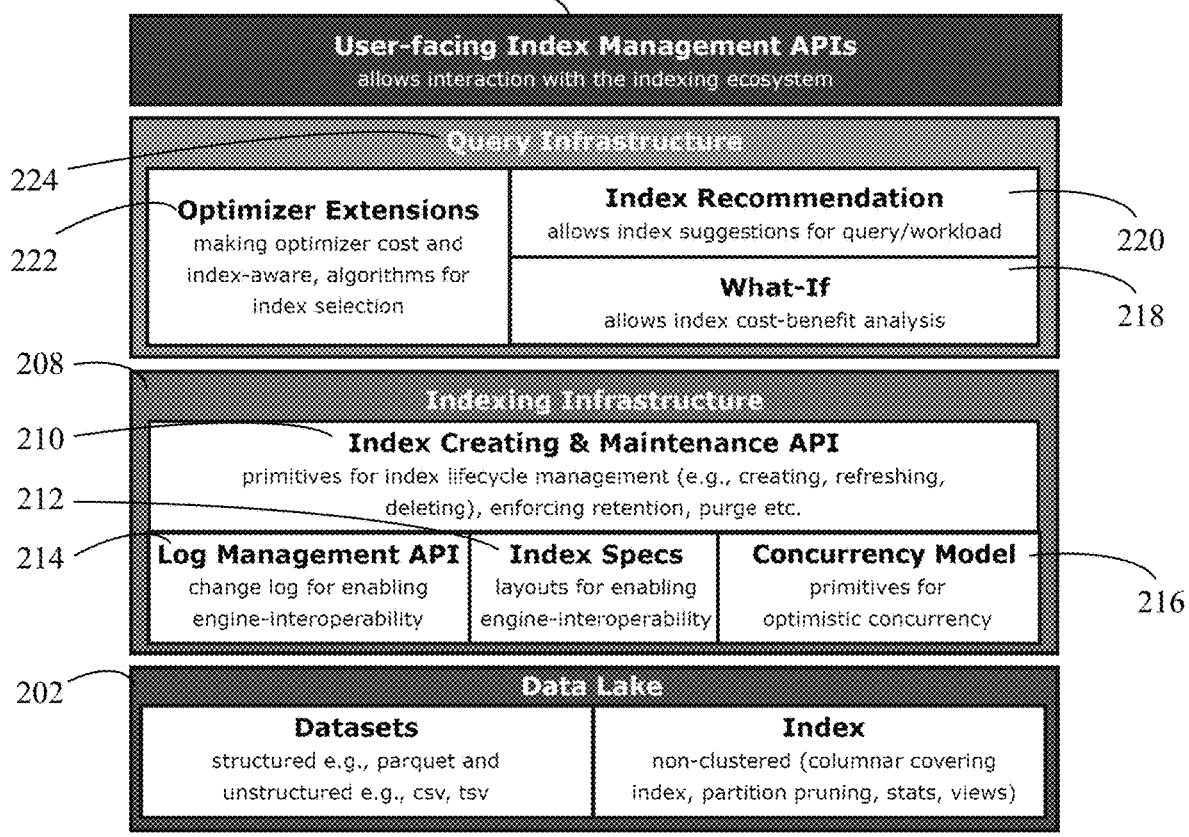
FIG. 2 depicts a hierarchical view of a data lake indexing and query system, according to an embodiment.

With the benefit of the above described advantages and background, further detailed description now turns to an architectural overview of a data lake indexing and query system, according to an embodiment. More specifically, FIG. 2 depicts an example hierarchical view 200 of a data lake indexing and query system, according to an embodiment. As shown in FIG. 2, data lake indexing and query system 200 includes a data lake 202, an indexing infrastructure 208, a query infrastructure 224 and a set of user-facing index management APIs 226. indexing infrastructure 200 supplies and includes a log management API 214, index specifications 212, a concurrency model 216 and on top of these, a set of index creating & maintenance API 210. Query infrastructure 224 of data lake indexing and query system 200 includes a set of optimizer extensions 222, an index recommendation system 220 and a "what-if" utility 218. Other structural and operational embodiments will be apparent to persons skilled in the relevant art(s) based on the following discussion regarding data lake indexing and query system 200 as depicted in FIG. 2.

In an embodiment, users can utilize indexing infrastructure 208 (available as a service or a library) to create and maintain indexes (or "derived datasets") on their data through the index creation and maintenance API (described further herein below). For examples, users can create a non-clustered columnar covering index, specify which the columns on which to create an index, and the columns to include as data columns. Note that embodiments do not require a separate "indexing service", because indexing infrastructure 208 can, in principle, leverage any available query engine (e.g., Spark) for index construction. As described in greater detail below, indexes and their metadata are stored on the data lake itself and for this reason, users can parallelize index scans to the extent that their query engine scales and their environment/business allows.

In embodiments, index metadata maintenance is managed by an index manager (not shown in FIG. 2) controlled through index creating and maintenance API 210. The index manager takes charge of index metadata creation, update, and deletion when corresponding modification happens to the index data, and thus governs consistency between index data and index metadata. The index manager also provides utility functions to read the index metadata from its serialized format. For example, the query optimizer can read all index metadata and then find the best index for given queries.

Embodiments may also enable primitive components underlying index creating and maintenance API 210. For example, such primitive components may comprise any or all of log management API 214, index specifications 212, or concurrency model 216.

As mentioned above and described in more detail below, support for multi-engine interoperability motivated the need to store all the indexes and their metadata on the lake. To track the lineage of the operations that take place over an index, embodiments record user operations in an operation log as described in greater detail herein below and may do so through log management API 214.

index specifications 212 support the extensibility advantage described above, because embodiments relate to index specifications 212 that reflect the properties of the corresponding underlying indexes (or derived datasets). These are exposed via index creating & maintenance API 210 and those wishing to extend the system to include other types of indexes/derived datasets must implement support for these APIs.

Finally, concurrency model 216 exposes primitives to support multi-user and incremental maintenance scenarios using optimistic concurrency control (as described further herein below).

Discussion now turns to the other major layer above the data lake, that of query infrastructure 224. Without loss of generality, components of query infrastructure 224 are described herein as being implemented as a Scala version library as an extension of the Spark optimizer (a.k.a., Catalyst) to make it index-aware. That is, given a query along with an existing index, embodiments implemented with Spark can perform transparent query rewriting to utilize the existing index. A step on a user's side to enable optimizer extensions 222 is to execute sparkSession.enableindexingSubSystem ( ) after creating the Spark session. Because embodiments treat an index as being just another dataset on the lake, users can exploit Spark's distributed nature to automatically scale index scans. Though embodiments are described above and hereinafter in terms of Spark and Scala, it should be understood that other embodiments may employ programming languages other than Scala, and query engines other than Spark.

While embodiments described herein introduce the notion of indexing on a data lake, an important aspect of big data administration that critically influences performance is the ability to select indexes to build for a given query or a workload. To decide the right indexes for a workload, it is crucial for users to be able to perform a cost-benefit analysis of the existing indexes and any 'hypothetical' indexes they have in mind. Query infrastructure 224 includes, therefore a "what if" utility 218 that allows users to quantitatively analyze the impact of existing or hypothetical indexes on performance of the system. Moreover, query infrastructure 224 further includes index recommendation module 220 that exposes automated index recommendations for automating the choice of indexes in query acceleration for big data workloads. The tool takes as input a workload of SQL queries, and suggests a set of suitable indexes. Implementation details of index recommendation module 220 and the "what if" utility 218 are described in greater detail herein below.

Figure 3:
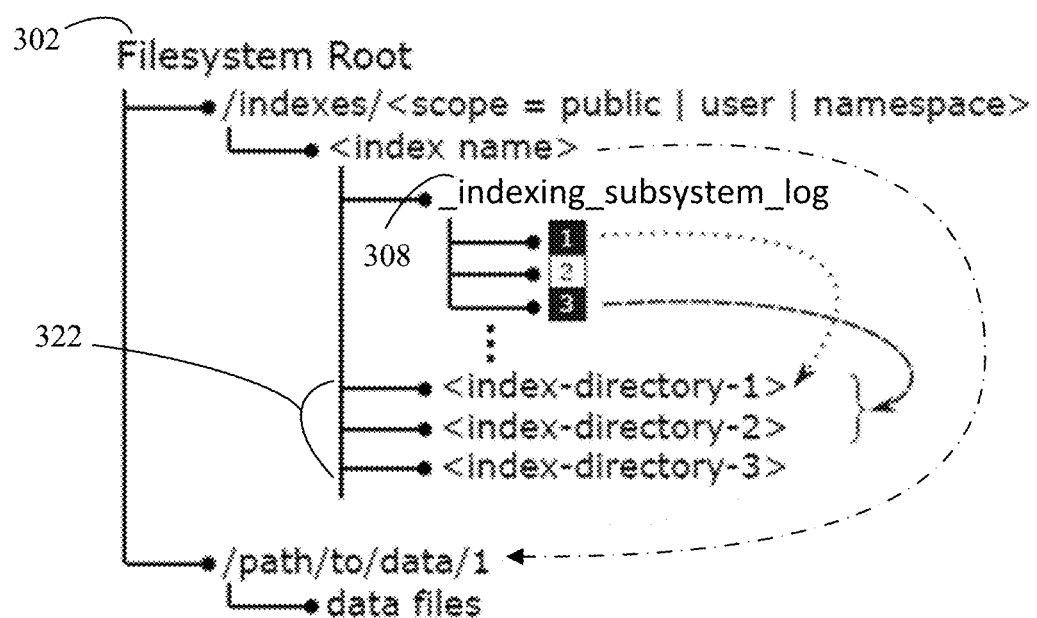
FIG. 3 depicts an example hierarchical organization diagram of index metadata on a data lake, according to an embodiment.

As mentioned herein above, embodiments store all index data and metadata on the data lake itself without any external dependencies. FIG. 3 depicts an example hierarchical organization diagram 300 of index metadata on the data lake, according to an embodiment. Other structural and operational embodiments will be apparent to persons skilled in the relevant art(s) based on the following discussion regarding hierarchical organization diagram 300 as depicted in FIG. 3.

In one embodiment, all indexes may be stored at the filesystem root 302 as depicted in FIG. 3. Such an arrangement may be advantageous depending on the indexes being employed. For example, indexes may comprise materialized views which themselves may span datasets which in turn necessitates a decoupling of the dataset from the index. In another, embodiment, however, the index may be co-located with the dataset. Embodiments may implement fine-grained access control mechanisms such as, for example, copying the most restrictive access control lists (ACLs) from the datasets being indexes to achieve stricter security and compliance. Because we allow the notion of disabling public indexes, users are free to provide hints to the optimizer with "index sets," thus allowing for A/B testing.

With continued reference to FIG. 3, each index as listed under/indexes/*/<index name>has two components:
  1) the directory named_indexing_subsystem_log 308 that contains the
    operational log of the index, i.e., the list of all operations that happened on this index since its inception; and
  2) the actual contents 322 of the index.

Notice that the contents are captured in multiple directories. This is to support functionality such as concurrent index management (e.g., snapshot isolation) and incremental maintenance (e.g., the latest index is a union of the contents of multiple directories).

FIG. 4 depicts example data lake indexing and query system application programming interfaces (APIs) 400 as exposed by embodiments in the context of Apache Spark. Note that the list is merely exemplary and should not be construed as a requirement for every engine nor for every embodiment. Other structural and operational embodiments will be apparent to persons skilled in the relevant art(s) based on the following discussion regarding APIs 400 as depicted in FIG. 4.

APIs 400 include index maintenance APIs at lines 2-8, which include APIs corresponding to actions such as create, delete, restore, vacuum, rebuild (sometimes referred to as "refresh", particularly when the rebuild is incremental), and cancel. The deleteIndex API of line 4 corresponds to a "soft delete," in embodiments, which tells the optimizer to not consider this index during optimization. The actual index referenced by the API calls is not permanently deleted, thus allowing the user to recover the deleted index using the restoreIndex API as shown on line 5. Alternately, the user can permanently delete an index already in a soft-delete state using the vacuumIndex API as shown in line 6. Users can cancel on-going index maintenance operations using the cancelIndex API as shown on line 8 and that may be useful if the user suspects that a maintenance job is stuck or has failed.

APIs 400 also include utility APIs for debugging and recommendation as shown at lines 11-15. These API are referred to as explain, what f and recommend as shown at lines 11, 12 and 14, respectively. The explain API allows users to obtain various useful information from the optimizer e.g., which part of the plan was modified, which indexes were chosen, why they were chosen, etc. The whatIf API allows users to provide the indexing subsystem with sample index configurations and get an explanation of how useful it would be if the indexes were built. The recommend API allows users to get a ranked recommendation of indexes/views that can be built for a workload of their choice.

APIs 400 also include storage and query optimizer customization configuration settings as shown at lines 18-21. These settings allow the user to override the behavior of the query optimizer and index management. For instance, by default, every index that gets created is discoverable, stored under the public folder making it accessible to all users at the workspace level. If this is not acceptable, and because indexes are accessible only to the user who created them, the user can choose private index locations and namespaces and thereafter create their private indexes and provide hints to the optimizer during optimization (e.g., by setting the configuration variables indexing_subsystem.index.creation.[path namespace] and/or indexing_subsystem.index.search.disablePublicindexes.

Having described the various APIs available in embodiments, discussion now turns to serverless index management enabled by the disclosed embodiments. As mentioned above, an advantage is a low-cost multiengine indexing subsystem that allows for concurrent index maintenance operations on an index that can be invoked by multiple engines. Although embodiments may be implemented with a server to mediate such operations, other embodiments described herein may simplify implementation by making index management "serverless" i.e., embodiments do not require a standalone server dedicated to index management tasks. The serverless functionality is achieved, in part, by storing all index information (e.g., metadata, operations on an index) in the data lake, and having that index track its own state through an index operation log incorporated into the index, and through other updates to its own metadata. Despite being serverless, embodiments enable concurrent updates through optimistic concurrency control (as described in further detail below). Further description of embodiments now turns to further description of one of these aspects: index metadata on the lake.

Interoperability is complex, as every query engine has to agree on what constitutes an index, which may require agreement between developers (and organizations/companies) working in different silo-ed ecosystems. Because the latter problem is much harder in reality, embodiments described herein prioritize a low-friction configuration for exposing index-related metadata (e.g., contents, state etc.) in a way that allows for easy integration. Exposing the state of an index or the list of operations invoked on an index through traditional means, such as a catalog service or a transaction manager service, guarantees strong consistency. However, this approach has a few major operational implications. First, it brings in service dependencies and live-site support overheads. Second, it makes integration complex because now every new engine has to depend on a third-party service. Finally, it introduces operational costs of running the service.

In consideration of these downsides, embodiments described herein trade-off metadata consistency for easier operational maintenance, i.e., the ground truth of information of an index is stored on the data lake. There are numerous ways of specifying the index information that need be stored. For example, FIG. 5A depicts an example index metadata specification 500, according to an embodiment. index metadata specification 500 includes three parts: a contents 504, a lineage 506 and a state 508. Other structural and operational embodiments will be apparent to persons skilled in the relevant art(s) based on the following discussion index metadata specification 500 as depicted in FIG. 5A.

Contents 504 may include the type and type-specific information of the derived dataset that is useful in instantiating appropriate index interpretation logic, such as name, kind, configuration (e.g., indexed and included columns plus their types), content (e.g., physical location and layout).

Lineage 506 may include information used to track lineage of the derived dataset, e.g., HDFS data source being indexed, information needed to refresh the index with minimal information from the user, information needed to perform index/view selection, and descriptive history of an index.

State 508 may include state information pertaining to the derived dataset, e.g., global information such as Active and Disabled, and transient information such as Creating and Deleted.

FIG. 5A also includes an operation log 510. Operation log 510 is described in greater detail herein below in conjunction with a description of multi-user concurrency control.

FIG. 5B depicts an example instance of a covering index 502 described according to the example index metadata specification 500 of FIG. 5A, according to an embodiment. Those skill in the art will readily understand the great majority of the metadata of covering index 502. A first thing to note, however, is that all metadata is stored in easily readable JSON format, which reduces dependencies for an integration with a query engine, and that provides support for spec evolution through versioning fields. Also please note plan node 514 under source node 512. Plan node 514 further includes a rawPlan node 516 that is a property of plan node 514. RawPlan node 516 is the raw query plan information for covering index 502. For instance, in the case of Spark, rawPlan node 516 is the serialized representation of the logical plan.

Including the raw query plan information in rawPlan node 516 of covering index 502 offers a number of advantages. First, the raw query plan enables support for transparent index refreshes (e.g., by invoking the rebuild( )API described above in relation to FIG. 4) without having the user provide the original query that was used when creating the index. Second, it allows a query engine to decide whether or not to utilize this index during optimization. For example, and recall that embodiments include multi-engine support, a query engine may examine the raw query plan for an index and discover that the index was created using an unsupported hash function and as a consequence omit that index from any optimized plans. Third, inclusion of the raw query plan is useful for debugging purposes.

Figure 6:
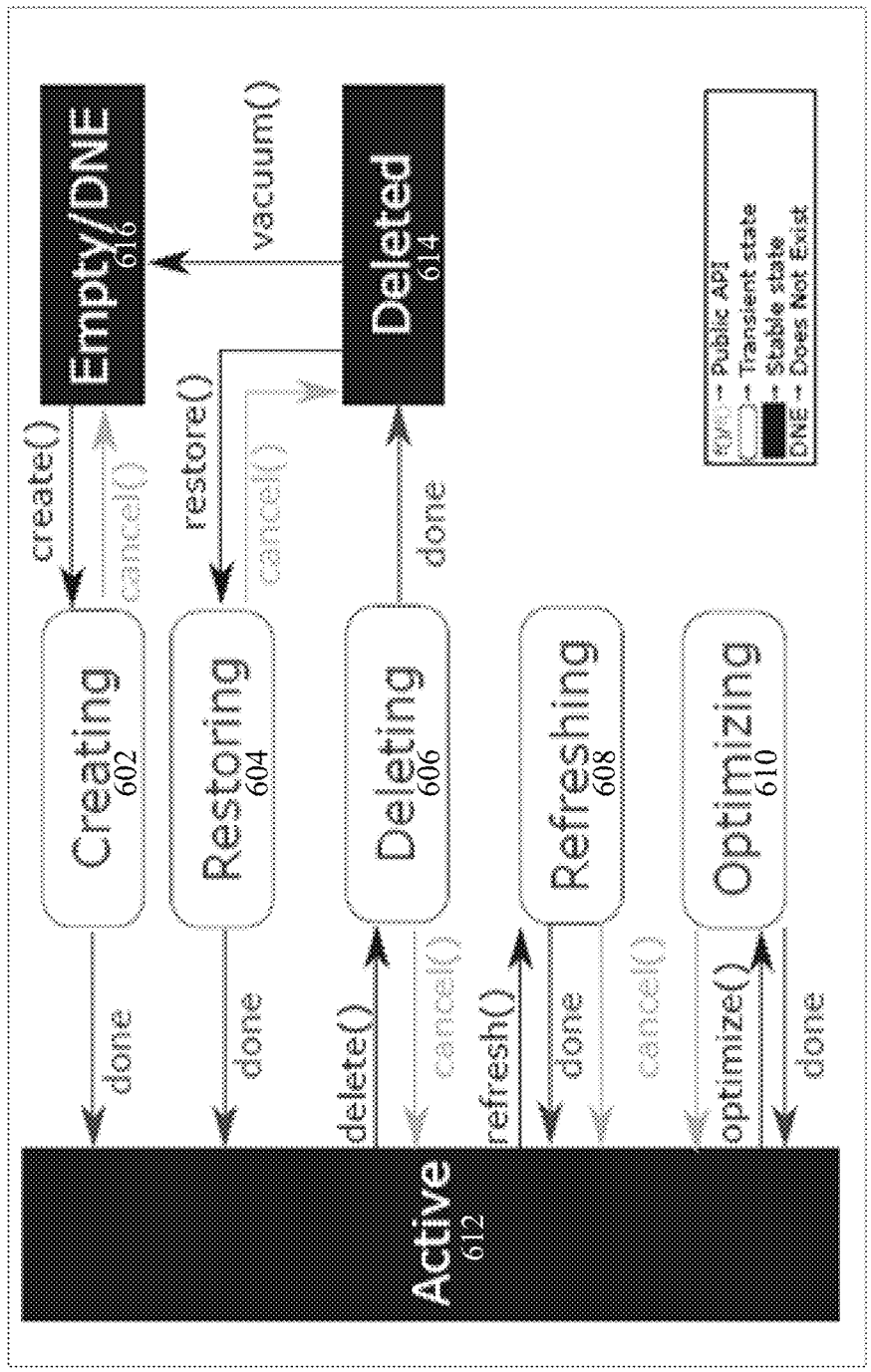
FIG. 6 depicts an example index state machine to support serverless stateful index operations, according to an embodiment.

Covering index 502 also includes a state node 518 which, as mentioned above, tracks the state of the index thereby enabling embodiments to be serverless. There are numerous ways of managing index state under a serverless paradigm. For example, FIG. 6 depicts an example index state machine 600 to support serverless stateful index operations, according to an embodiment. State machine 600 includes the following transient states: creating 602, restoring 604, deleting 606, refreshing 608, and optimizing 610. State machine 600 also includes the following stable states: active 612, deleted 614 and empty/DNE 616 (where 'DNE'='does not exist'). Other structural and operational embodiments will be apparent to persons skilled in the relevant art(s) based on the following discussion of index state machine 600 as depicted in FIG. 6.

Because embodiments are implemented in a serverless paradigm, there is of course no server to maintain or track index states. Accordingly, embodiments manage index states by according to the state transitions illustrated in index state machine 600 of FIG. 6. Note that states active 612, deleted 614 and empty/DNE 616 are stable states, whereas the other states are transitioning. These state transitions are described as follows:

Creating 602: Assuming no index exists, the state machine starts in state empty/DNE 616. When a user invokes the createindex( ) API as described above in conjunction with FIG. 4, the index being created enters state creating 602 from state empty/DNE 616. If for some reason, while the index is still in state creating 602, the user cancels index creation by issuing the cancelIndex( ) API, then the index goes back to state empty/DNE 616.

Active 612: Once the index is created successful, the index transitions to state active 612 and becomes visible (the index is not visible when it is in state creating 602). An index ordinarily spends most of its time in state active 612.

Refreshing 608: An existing index may be refreshed/rebuilt via the indexRebuild( ) API described above. Although the terms refresh and rebuild are basically used interchangeably herein, the term "refresh" is often applied an incremental rebuild. Note, refreshing does not block index visibility—consumers of the index may continue to access the current active copy of the index until refreshing is finished.

Deleting 606: A user can delete an index using the deleteIndex( ) API described above. During the delete operation, the index enters state deleting 606. As described above, a delete operation is a soft delete only (for the sake of speed) and has the effect of making the index invisible/unusable.

Deleted 614: Upon completion of the deleteIndex( ) call, the index enters state deleted 614.

Restoring 604: Because a delete is only a soft delete, a restoreIndex( ) command may restore the index at which point the index enters state restoring 604 and upon completion, the index again enters state active 612. Again, the index is not visible when it is in the Restoring state.

Optimizing 610: A user can further choose to optimize the index via an optimizeindex( ) API. For example, one optimization is index compaction, where (small) index blocks generated incrementally are merged into larger ones to improve index read efficiency.

In a multi-user scenario, clearly some index states conflict with one another (i.e., the index cannot take on certain states for different users at the same time). For example, if an index is in state deleting 606, refreshing 608, or optimizing 610 in one user session, the cannot be in state restoring at the same time in another concurrent user session. This can be appreciated because the index can only move to deleting 606, refreshing 608, or optimizing 610 from active 612, whereas it can only enter restoring 604 from deleted 614. If two API calls can lead to conflicting index states, they are incompatible. Table 1 illustrates the compatibility matrix of APIs disclosed herein, and shows the API calls of one user (e.g., when reading across) that are incompatible with that of a second user (reading downward), where C=create, D=delete, O=optimize, RF=refresh, RS=restore and V=vacuum.

TABLE 1

Compatibility matrix of index management APIs

| API | C | D | O | RF | RS | V |
|-----|---|---|---|----|----|---|
| C   | Y | N | N | N  | N  | N |
| D   | N | Y | Y | Y  | N  | N |
| O   | N | Y | Y | Y  | N  | N |
| RF  | N | Y | Y | Y  | N  | N |
| RS  | N | N | N | N  | Y  | N |
| V   | N | N | N | N  | N  | Y |

Figure 7:
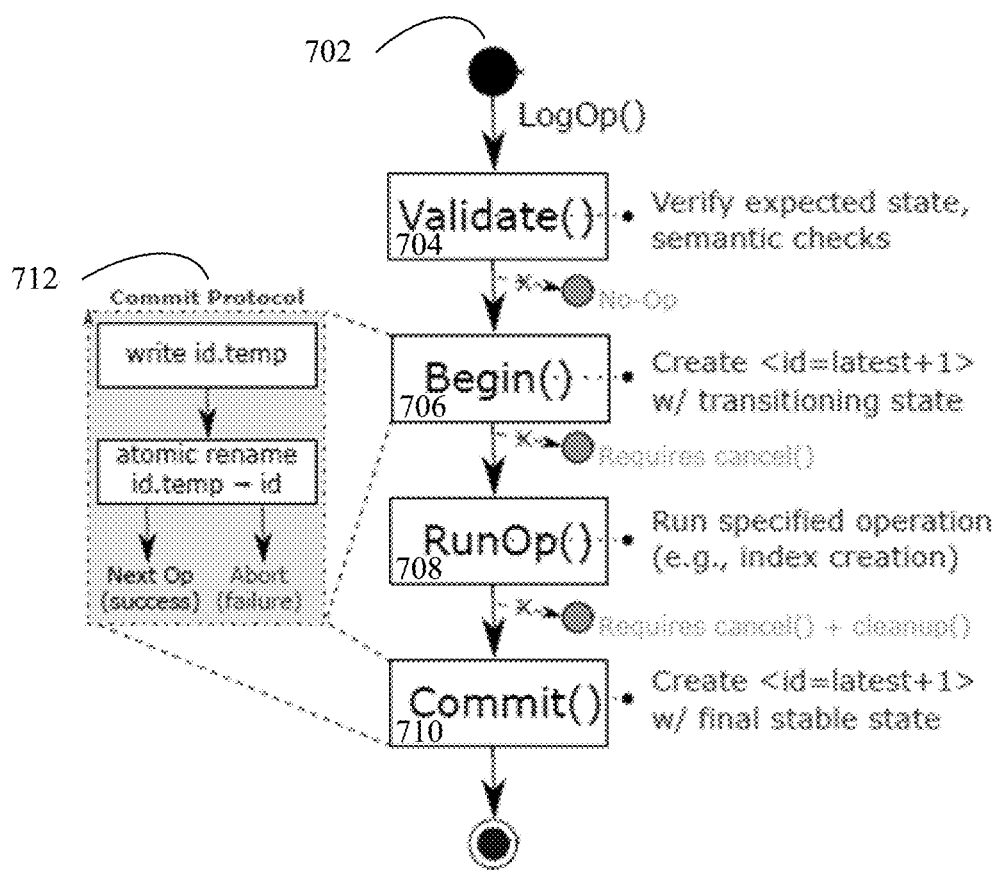
FIG. 7 depicts example log operations to support concurrency control of serverless multi-user index operations, according to an embodiment.

Although Table 1 prevents an index from reaching incompatible states in two different user sessions, it cannot prevent two different users from attempting to make conflicting changes to the index. To address this problem, embodiments ensure the index consistency through optimistic concurrency control. As described above, embodiments implement an optimistic concurrency control scheme that utilizes the example log operations 700 according to FIG. 7. The example log operations 700 include a LogOp( ) 702, a Validate( ) 704, a Begin( ) 706, a RunOp( ) 708, Commit( ) 710 and a Commit Protocol 712. Such operations are performed using operation log 510 of FIG. 5A, and are described herein below:

LogOp( )—records the index manipulation that a user is going to attempt to operation log 510

Validate( )—validates whether the index is in a suitable state that allows for the desired manipulation (e.g., one cannot delete an index that does not exist)

Begin( )—assigns an id to the index manipulation with the corresponding transitioning state RunOp( )—records to operation log 510 that the desired manipulation is now running Commit( )—records the id of the finished index manipulation to operation log 510, including the corresponding final stable state Commit( ) relies on the atomicity of renaming a file in a cloud file system (such as, e.g., HDFS, Azure Storage, or Azure Data Lake) to ensure that altering index state from a transitioning state to a stable state during Commit( ) is atomic. For example, if during a commit the file corresponding to the index transitioning state is renamed, the commit and transaction as a whole may be aborted (as depicted in commit protocol 712). The transaction may be attempted again later after receiving an abort message.

Figure 8:
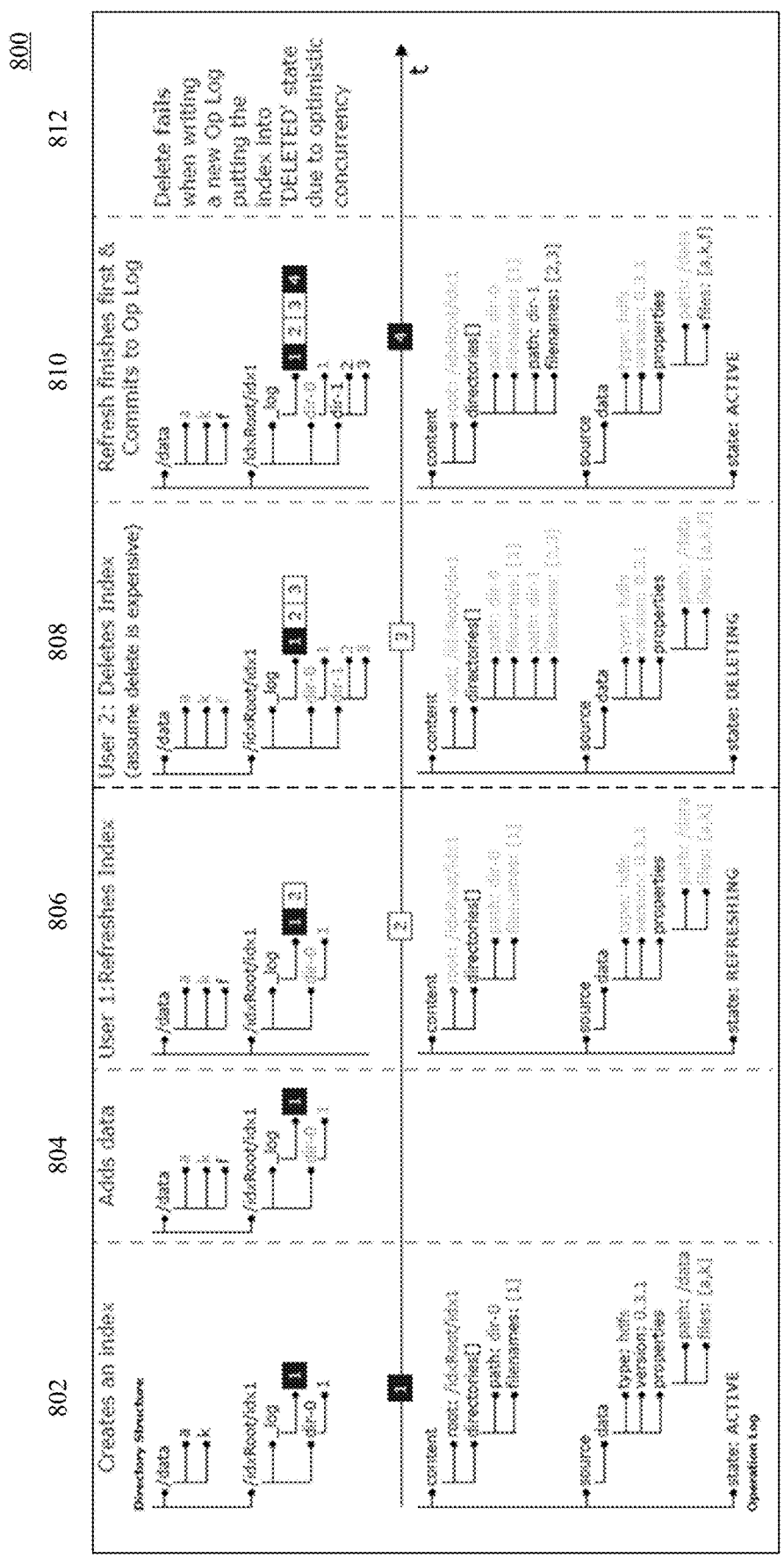
FIG. 8 depicts an example timeline illustrating use of the example log operations of FIG. 7 to manage concurrent index manipulations by two users, according to an embodiment.

An example transaction is illustrated in timeline 800 of FIG. 8 illustrating use of the example log operations of FIG.

7 to manage concurrent index manipulations by two users. Timeline 800 proceeds from left to right wherein, initially, an index is created at step 802, and data is added at step 804. At step 806, a user (User 1) tries to refresh an existing index. Near simultaneously, another user (User 2) tries to delete the same index at step 808. Assuming that the deletion is expensive (i.e., time consuming), the refresh from User 1 finishes first at step 810 successfully. When the deletion of User 2 attempts to commit, the log reflects the fact that the state of the index changed (due to the refresh of User 1), and the delete fails at step 812.

Embodiments are enabled to permit multiple writers using the above concurrency control mechanism, and multiple readers. For a reader of the index, any stable snapshot of the index data that has committed ordinarily suffices. To ensure consistency between the index and the corresponding data being indexed, embodiments may employ a signature-based mechanism whereby the latest timestamps of the data files are used to generate a signature (e.g., signature 520 as shown in FIG. 5A) for the index. As described more herein below, during query processing, it is possible that a query may touch a table as well as its indexes simultaneously. Using the signature of the data that is stored in the index metadata, the optimizer can ensure that the index is not stale. In a serverless regime, it is not generally possible to guarantee perfect external consistency. For example, it is possible that a query is accessing data that has been updated since the data was validated using signature 520 of the index, and there are no locks on the resources. Instead, external consistency has to be supported at the query engine level—i.e., external consistency can be supported only if the query engine can expose such an API.

The description set forth above provides a framework for indexes and a corresponding lifecycle API. Of course, such indexes are not useful unless they can be leveraged at query time. Accordingly, the query optimizer of a query engine must be made aware of the existence and format of the indexes, and be enabled to properly process such indexes. As described in further detail herein below, embodiments lever indexes by incorporating new rules into Spark's rule-based query optimizer. In particular, Filter and Join index Rules are defined, and may be used to optimize the query plan of a given query to use available indices. In the next section, we start by discussing the impact of indexes on query execution. We then present the details of the implementation and integration of indexing rules. Integration of indexing rules into other types of query optimizers, such as ones that follow the architectures of Starburst, Volcano, or Cascades would be similar.

As mentioned above, embodiments described herein focus on two workhouse

Spark operators in query processing, filter and join, merely to illustrate the concepts (i.e., other operators, such as aggregations and group by, may also be optimized in a similar way). More specifically, embodiments implement two query optimizer rules, FilterIndexRule and JoinIndexRule, that target accelerating filter and join operators in Spark query execution plans using indexes as described herein above. Although not described herein, such indexes may also be beneficial for other operators, such as aggregates on top of group-bys, among others. Herein below, we formally define FilterIndexRule and JoinIndexRule.

A FilterIndexRule works as follows: if a table scan has a filter f on top of it, we replace it by an index I if the following conditions meet:

The leading column in the indexed (key) columns of I is referenced by some predicate in f All columns referenced by predicates in f are covered by I, i.e., appear in either the indexed or included columns of I.

Consider an example, in FIG. 9, that illustrates an example application 900 by a query optimizer of a Filter index Rule to a SQL query, according to an embodiment. Example application 900 assumes an input configuration 902 that includes tables 904, a query 906 and indexes 908. indexes 908 include a single index, $F_1$, which is a Filter index. index $F_1$ includes an indexed column R.a (i.e., R.a is a key column of index $F_1$ which is denoted by being underlined), and an included column, R.b. Having received query 906, a query optimizer may generate original query plan 912 in response. The indexing rule first searches the query plan for matches of the pattern Scan->Filter.

In original query plan 912 generated from query 906, there are two such matches:

(M1) Scan (R)->Filter (R.a=5);

(M2) Scan (S)->Filter (s.d >200).

For each match, the indexing rule directs the query optimizer to further examine whether there is an index that meets the condition and if so, replace the table scan by the corresponding index. In our example, only the match (M1) has such an index: index $F_1$ that is defined to have an indexed column equal to R.a. As a result, the scan operator on top of the table R is replaced by a scan operator on top of the index $F_1$ instead, resulting in optimized query plan 914.

The JoinIndexRule works in a similar manner by looking for candidate indexes via pattern matching. However, unlike the FilterIndexRule, it is not possible to match a specific pattern except for merely matching individual join operators. When a matching join operator is found, it is inspected to see if it satisfies the equi-join condition i.e., a join condition that is restricted to be a conjunction of equality predicates between join columns.

After matching an eligible join operator O with join condition c, the next step is to find usable indexes for O. Given that both the left and right sub-plans of a join are linear, there are only two base tables in the plan tree under O. For each base table T, the following conditions are checked for each candidate index I on top of T:

All join columns in T that are referenced by c should be the same as the indexed columns of I;

All other columns referenced by the left or right sub-plan that accesses T are contained by the included columns of I.

More formally, let $\mathcal{I}_\ell$ and $\mathcal{I}_r$ be the candidate indexes found for the left and right sub-plan, respectively. indexes may be further pairs by performing the following compatibility test:

Consider an index $I_l \in \mathcal{I}_\ell$ and an index $I_r \in \mathcal{I}_r$. The pair of two indexes $(I_l, I_r)$ is compatible if the indexed columns $(K_{l1}, \ldots, K_{ln})$ of $I_l$ and the indexed columns of $(K_{r1}, \ldots, K_{rn})$ of $I_r$ are pairwise associative, i.e., each column pair $(K_{lj}, \ldots, K_{rj})$ appears in an equi-join predicate $K_{lj}=K_{rj}$. Note, $I_l$ and $I_r$ must have the same number of indexed columns.

The above described compatibility test may be understood by way of an example: Consider the query:

SELECT A, D FROM T1, T2
WHERE T1.A=T2.B AND T1.0=T2.D
Suppose that we have two indexes $I_1 \langle (A,C);( ) \rangle$ over $T_1$ and $I_2 \langle (B,D); ( ) \rangle$ over $T_2$. Then $(I_1, I_2)$ is compatible. If instead of $I_2$, we have index $I'_2 \langle (D,B); ( ) \rangle$, then $(I_1, I'_2)$ is not compatible.

It is possible that more than one compatibility index pair exists. In one embodiment, the index pair that results in the least execution cost may be selected based on the following criteria:

If there exist compatible index pairs ($I_l$, $I_r$) such that $I_l$ and $I_r$ have the same number of buckets, then pick the index pair with the largest number of buckets.

Otherwise, if no such index pair exists, then pick an arbitrary index pair from the eligible pairs.

These criteria are used for a few reasons. First, when two indexes have the same number of buckets, there is no shuffling when performing the (sort-merge) join. That is, if the number of buckets differ, one index gets reshuffled into the number of buckets equal to the other. Second, generally speaking a greater number of buckets may lead to better parallelism in join execution (assuming no resource constraint).

Finally, JoinIndexRule replaces the scan operators on top of the tables by scan operators on top of the corresponding indexes in the best compatible index pair. For example, consider FIG. 10 which illustrates an example application 1000 of a JoinIndexRule to a SQL query, according to an embodiment. Example application 1000 includes input configuration 1002 which is based on input configuration 902 of FIG. 9. In particular, input configuration 1002 includes table 904 and query 906 from FIG. 9. Input configuration 1002 also includes indexes 1008 which is based upon indexes 908 of FIG. 9, but which now includes two Join indexes $J_1$ and $J_2$.

Application of the JoinIndexRule then proceeds per the description herein above.

In particular, because there are now two Join indexes $J_1$ and $J_2$, original query plan 912 may inspected for eligible join operators. Here, original query plan 912 includes a join operator 1010 with the join condition R.b=S.c. Next, the left and right sub-plans of the join are inspected for candidate indexes. We find index $J_1$ is applicable to the left sub-plan (due to the presence of column R.a in filter operation 1012) and index $J_2$ to the right sub-plan (due to the presence of column S . d in filter operation 1016). Clearly, ($J_1$, $J_2$) is the unique compatible candidate index pair. As a result, the scan operators on top of table R and table S may be replaced by scan operators on top $J_1$ and $J_2$, respectively, resulting in optimized query plan 1014.

As described above, the FilterIndexRule and JoinIndexRule define rules that permit a query engine to optimize a query plan to take advantage of corresponding indexes. The use of such rules must, however, be integrated into the query engine. As mentioned above, embodiments herein are described in terms of the Spark query engine (aka, Catalyst). As a rule-based query optimizer, integrating these rules is straightforward and mainly consists of incorporating the indexing rules into the rules employed by the optimizer, there are two decisions that need to be made: where to include the new rules, and in what order to apply the new rules.

Where to include the rules? Having the new rules in the wrong place may lead to unexpected consequences due to potential interactions and side effects between the rules. Embodiments described herein, however, merely replace base tables by eligible indexes which has no effect on downstream operators in the logical plan. Accordingly, the new rules may be applied after all other optimizer rules (i.e., after the query optimizer has otherwise completed the logical query plan).

What is the order of the rules? Because the FilterIndexRule and JoinIndexRule each are applied after all other rules, the order is somewhat arbitrary and may be done in either order. However, embodiments may benefit from putting the JoinIndexRule before the FilterIndexRule because one may expect that the index for a join may lead to more improvement.

Having described the architecture of the indexing subsystem, lifecycle management of indexes, and usefully leveraging such indexes in a query, description turns herein below to the question of: given a known workload of queries, what index(es) would be most beneficial to create?

Embodiments described herein below provide an index recommendation framework that operates in two major steps:

1) Candidate Generation—Candidate indexes are generated based on the characteristics of the query workload; and 2) Selection of the best indexes—The best indexes of the candidate indexes are selected using either a rule-based approach, or a cost-based approach.

whereby, given a workload of queries, a set of candidate indexes is created, and the best indexes of that set are selected and recommended for building (or, alternatively, automatically built).

Figure 11:
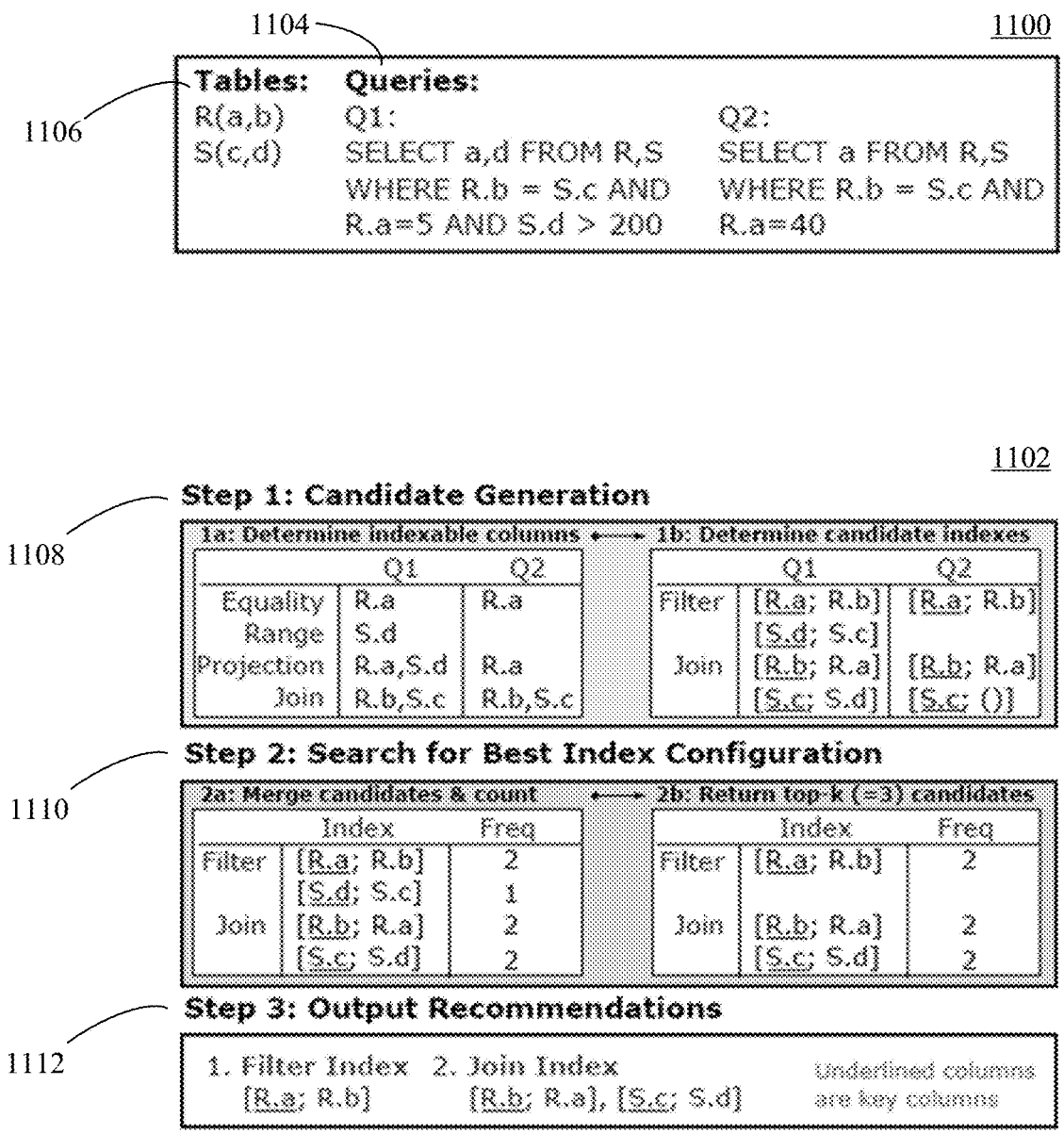
FIG. 11 depicts an example workload and example steps for generating index recommendations for that workload, according to an embodiment.

This two-step process is further explored with reference to FIG. 11 which depicts an example workload 1100 and example steps 1102 for generating index recommendations for workload 1100. Workload 1100 includes queries 1104 which includes query Q1 and query Q2. Also depicted with workload 1100 is the data source being queried shown in the form of tables 1106. Example steps 1102 include steps 1108-1112 directed to Step 1: candidate generation, Step 2: search for the best index configuration and Step 3: output of recommendations, respectively. Step 1108 includes substeps 1a and 1b. Likewise, Step 1110 includes substeps 2a and 2b. Other structural and operational embodiments will be apparent to persons skilled in the relevant art(s) based on the following discussion example steps 1102 as depicted in FIG. 11.

The main idea of candidate generation a step 1108 of FIG. 11 is the following:

1. Each query of workload 1100 is inspected to determine indexable columns (e.g., at step 1a); and 2. Candidate indexes are constructed using the a (e.g., at step 1b).

In an embodiment, candidate generation may proceed according to Algorithm 1 shown herein below:

| Algorithm 1 |
|---|
| Input: $\mathcal{W} = \{q_1, \ldots, q_n\}$: a workload of queries<br>Output: $\mathcal{J} = \{I_1, \ldots, I_n\}$: candidate indexes. |
| 1:   Main: |
| 2:   // Stage 1 — Generate all 'indexable columns' |
| 3:   foreach $q \in \mathcal{W}$ do |
| 4:     \|  q. $\varepsilon \leftarrow \{c \mid c \in$ equality predicates of q$\}$; |
| 5:     \|  q. $\mathcal{R} \leftarrow \{c \mid c \in$ range predicates of q$\}$; |
| 6:     \|  q. $\mathcal{J} \leftarrow \{c \mid c \in$ equi-join predicates of q$\}$; |
| 7:     \|  q. $\mathcal{W} \leftarrow \{c \mid c \in$ group-by lists of q$\}$; |
| 8:     \|  q. $\mathcal{P} \leftarrow \{c \mid c \in$ projection lists of q$\}$; |
| 9:     \|  q. $\mathcal{C} \leftarrow$ q. $\varepsilon \cup$ q. $\mathcal{R} \cup$ q. $\mathcal{J} \cup$ q. $\mathcal{P}$; |
| 10:   //Stage 2 – Generate candidate indexes; |
| 11:   $\mathcal{J} \leftarrow \emptyset$; |
| 12:   foreach $q \in \mathcal{W}$ do |
| 13:     \|  (table T, T.$\mathcal{C}$) $\leftarrow$ Group q.$\mathcal{C}$ by tables; |
| 14:     \|  foreach (table T, T.$\mathcal{C}$) do |
| 15:     \|  \|  //Generate an index targeting filter; |
| 16:     \|  \|  $I_{filter} \leftarrow$ GenerateFilterIndex(T, T.$\mathcal{C}$); |
| 17:     \|  \|  $\mathcal{J} \leftarrow \mathcal{J} \cup \{I_{filter}\}$; |
| 18:     \|  \|  //Generate index targeting joins; |

```
Algorithm 1

19:      |  |   I_join ← GenerateJoinIndex(T, T.C);
20:      |  |   J ← J ∪ {I_Join};
21:      return J;
22:
23:      GenerateFilterIndex(T, T.C):
24:         T.S ← T.ε + T.R;
25:         I.indexedCols ← T.S;
26:         I.includedCols T.C - T.S;
27:         return I;
28:
29:      GenerateJoinIndex(T, T.C):
30:         I.indexedCols ← T.J;
31:         I.includedCols ← T.C - T.J;
32:         return I;
```

Algorithm 1 is described with continued reference to candidate generation step 1108 of FIG. 11. Embodiments may be configured to determine different types of indexable columns as known in the art. In one particular embodiment, Algorithm 1 extracts the following indexable columns from a query q:

ε—columns appearing in equality predicates (i.e., x=α where x is a column and α is a constant) of q (line 4 of Algorithm 1);

$\mathcal{R}$—columns appearing in equality predicates (i.e., x≤α or x≥α where x is a column and a is a constant) of q (line 5 of Algorithm 1);

$\mathcal{J}$ columns appearing in equi-join predicates (i.e., R.x=S.y where R and S are tables) of q (line 6 of Algorithm 1);

$\mathcal{G}$—columns appearing in group-by lists (i.e., GROUP BY $x_1, \ldots, x_m$) of q (line 7 of Algorithm 1);

$\mathcal{P}$—columns appearing in projection lists (i.e., SELECT $x_1, \ldots, x_m$) of q (line 8 of Algorithm 1)

The set of indexable columns $\mathcal{C}$ of q is simply the union of the above sets of columns (and as reflected by line 9 of Algorithm 1).

Having enumerated the indexable columns at lines 3-9 of Algorithm 1, candidate indexes for each query q, of the workload W are generated from the indexable columns at lines 13-21 of Algorithm 1, a description of which follows herein below.

To construct candidate indexes from the indexable columns, the indexable columns are grouped together by their corresponding tables (accessed by the query) on line 13. Algorithm 1 then loops over each such group of indexable columns that correspond to a particular table and generates candidate indexes for each at lines 15-20.

In particular, one or more indexes are created for indexable columns corresponding to filters (line 16 of Algorithm 1) and indexes for indexable columns corresponding to joins (line 19 of Algorithm 1) if any.

The candidate indexes corresponding to filters are denoted as $I_{filter}$ at line 16, wherein each candidate index therein includes indexed columns and included columns. The indexed columns are formed by the concatenation of the equality filtering columns in ε with the range filtering columns in $\mathcal{R}$, whereas the remaining indexable columns form its included columns (as shown in the helper function GenerateFilterIndex( ) at lines 24 to 26 of Algorithm 1). The candidate indexes corresponding to joins are denoted as $I_{join}$ at line 19, and like the filter indexes, each candidate index includes indexed columns and included columns. The equi-join columns in $\mathcal{J}$ form the indexed columns, whereas the remaining indexable columns form its included columns (as shown in the helper function GenerateJoinIndex( ) at lines 30 to 31 of Algorithm 1).

Upon completion of Algorithm 1, step 1108 of FIG. 11 is likewise complete, and embodiments next must determine which index configuration is best. To select the best indexes from the set of index candidates $\mathcal{J}$ returned by Algorithm 1, one approach is to enumerate all subsets of $\mathcal{J}$ and find the subset that leads to the best improvement over the workload $\mathcal{W}$ in terms of query execution time. This approach, however, may not be feasible in practice when is $\mathcal{J}$ large. Accordingly, embodiments disclosed herein apply heuristic approaches.

The first such heuristic approach is a rule-based approach whereby deterministic statistics for the candidate indexes are compared. In particular, embodiments may implement a frequency-based approach as shown in Algorithm 2 herein below:

```
Algorithm 2

Input: W = {q_l, ..., q_n}: a workload of queries
       J = {I_l, ..., I_n}: candidate indexes from Algorithm 1
       K: the number of indexes to be returned
Output: The best K indexes from J.
1:  // Step 1: Count;
2:  foreach I ∈ J do
3:  |  foreach q ∈ W do
4:  |  |  if I is a candidate index from q then
5:  |  |  |  I.freq ← I.freq + 1;
6:  //Step 2: Merge
7:  J_best ← ∅;
8:  Group index in J by their indexed columns;
9:  foreach (indexed column K, index group J_K) do
10: |  //Merge the indexes into one single index I_merged;
11: |  I_merged.indexedCols ← K;
12: |  I_merged.includedCols ← ∪_{I∈J_K} K;
13: |  I_merged.freq ← Σ_{I∈J_K} I. freq;
14: //Step 3: Rank
15: Sort J_best by decreasing order of I.freq for I ∈ J;
16: return The top K indexes in the ordered J_best
```

Algorithm 2 may be summarized as three steps as follows:

1. Count index frequency (lines 2-5), where we count the number of appearances of each candidate index in the workload of queries;
2. Merge candidate indexes (lines 7 to 13), where we merge indexes with the same indexed column into one single index by combining their included columns; and
3. Rank merged indexes (line 15), where we sort the merged indexes by the decreasing order of their frequencies.

Algorithm 2 then returns the top K indexes from the ordered candidates (at line 16), where K is a pre-determined given by the user.

Though often the frequency-based often provides good index recommendations, the approach may not be ideal for all workloads. First, just because a candidate index would be used frequently by the queries of a workload does not necessarily mean that the index provides a large reduction in query execution time. For example, such an index might be over a frequently accessed and small reference (i.e., dimension) table having a negligible access time. Second, while merging candidate indexes with the same indexed columns has the advantage of reducing index storage and maintenance overhead, it may be difficult to measure the efficacy without proper understanding of the overhead. To address these and other issues, embodiments may instead employ a cost-based approach that relies on modeling the query execution cost.

One embodiment of a cost-based approach to index selection relies on several basic building blocks:
1. A cost model that estimates the execution cost of a given query plan;
2. A "what if" utility that returns the hypothetical query plan and its cost without actually building the indexes; and
3. An efficient search algorithm that looks for the indexes that result in minimum workload execution cost.

Figure 12A:
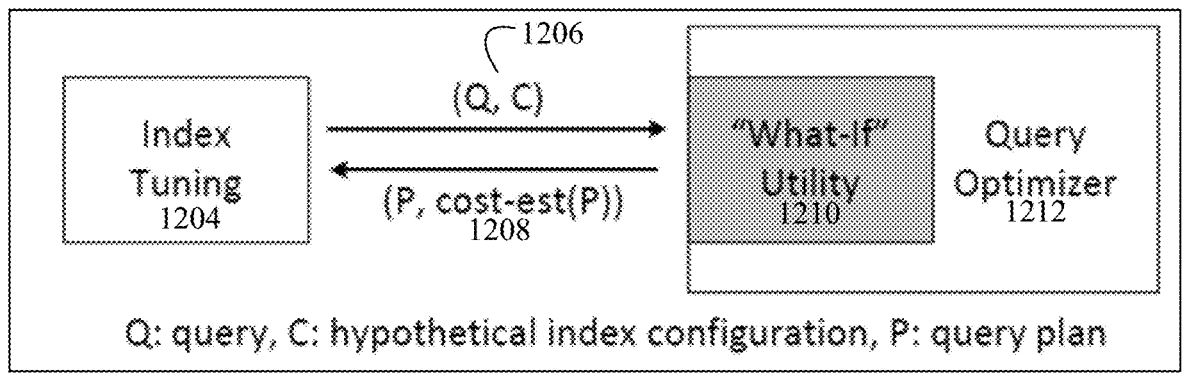
FIG. 12A depicts an architectural overview of cost-based index tuning using a "what if" utility, according to an embodiment.

FIG. 12A depicts an architectural schematic 1200 of cost-based index tuning using a "what if" utility 1210, according to an embodiment. Schematic 1200 includes an index tuning module 1204 and a query optimizer 1212 that includes a "what-if" utility 1210. Other structural and operational embodiments will be apparent to persons skilled in the relevant art(s) based on the following discussion regarding schematic 1200 as depicted in FIG. 12A.

At a high level, the cost-based approach embodied by schematic 1200 of FIG. 12A works as follows. index tuning module 1204 provides the ordered pair 1206 comprising a query q and a hypothetical index configuration C to "what-if" utility 1210. The hypothetical index configuration may include a set of candidate indexes as described herein above. "What-if" utility 1210 may, in conjunction with query optimizer 1212, generate the ordered pair 1208 that comprises a query plan P, and an estimated cost for executing plan P (denoted as 'cost-est(P)' in FIG. 12A). The query plan P is the plan generated by the query optimizer assuming that the indexes of configuration C have in fact been built. Likewise, the cost estimate cost-est(P) reflects an estimate of the execution cost of plan P. More detailed description of this high-level overview is included herein below in the context of FIG. 12B which depicts an example 1202 application of "what if" utility 1210 to a SQL query, according to an embodiment. Example 1202 includes tables 1214, a SQL query 1216, filter index $F_1$ 1218, plan P 1220, plan P' 1222, cost R 1224 and cost R' 1226. Other structural and operational embodiments will be apparent to persons skilled in the relevant art(s) based on the following discussion "what-if" utility 1210 as depicted in FIG. 12.

Figure 12B:
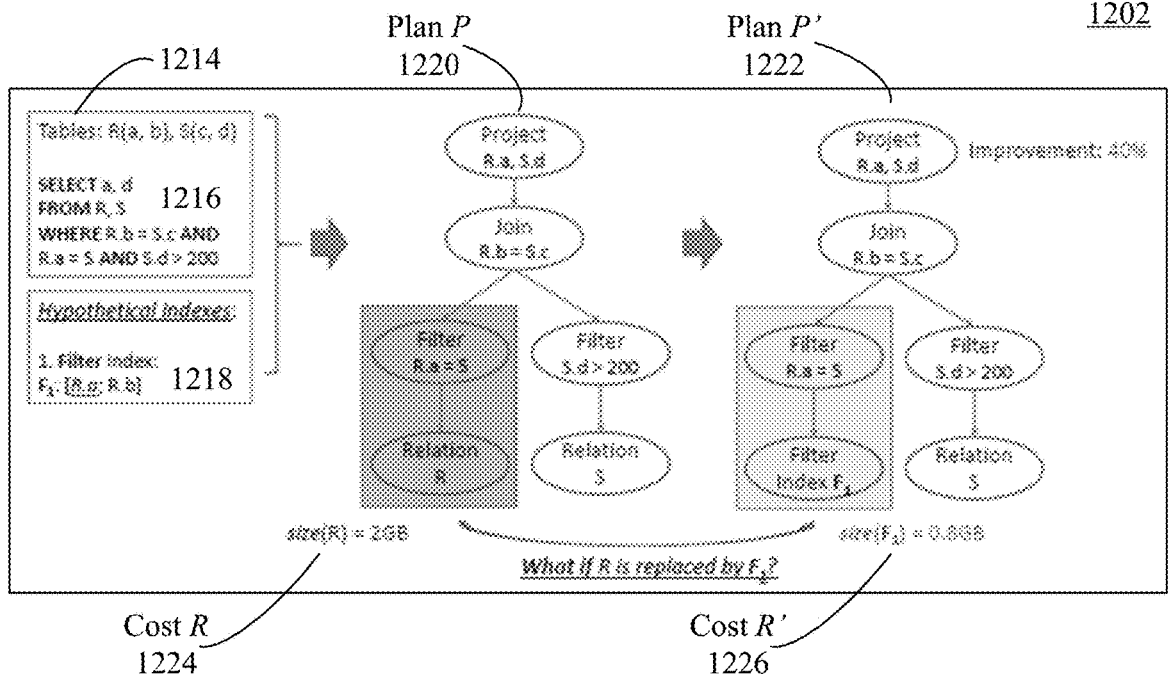
FIG. 12B depicts an example application of the "what if" utility to a SQL query, according to an embodiment.

As shown in FIG. 12B the data source has two tables 1214 to be queried: R(a, b) and S(c, d), and query 1216 is a simple filter-join query applied to them. Suppose that the user wants to understand the performance impact on query 1216 by building index $F_1$ 1218. In an embodiment, the user may invoke "what if" utility 1210 without building index $F_1$ 1218. Such an invocation generally proceeds as follows:
1. The plan P 1220 returned by query optimizer is received, and filter predicates are searched for that can be evaluated using index $F_1$ 1218.
2. index $F_1$ 1218 is determined as beneficial for accelerating the processing of the filter R.a=5.
3. The table scan on R is replaced by accessing the "hypothetical" filter $F_1$ 1218, and a new plan P' 1222 is generated. Plan P' 1222 is not executable (because filter $F_1$ 1218 has yet been built).
4. The cost estimation procedure is invoked on new plan P' 1222 and its estimated cost is generated. (Again, this cost is imaginary and makes sense if $F_1$ were is built).

To determine the cost P, a cost model may be applied to plan P 1220. For example, suppose the cost model is configured to estimate the output size of each operator. Suppose that the size of table R is 2GB meaning that a table scan over R incurs the cost retrieving and processing 2GB (denoted as cost R 1224). The cost model employed by "what-if" utility 1210 may determine, on the other hand, that when the table scan of R is replaced by index $F_1$ 1218, then the size can be reduced to 0.8GB which is cost R' 1226 as shown in FIG. 12B.

In this fashion, a cost model may estimate the output size of all the operators in plan P 1220 and likewise to the operators in plan P' 1222, sum the respective costs and determine an estimated cost for executing each plan. Having done so, one may now compare the cost of plan P 1220 and plan P' 1222, and compute the improvement. For the example here, assume cost(P)=size(P)=2.5GB, and cost(P')=size(P)=1.5GB, which are the sum of the output sizes of all operators in plan P 1220 and plan P' 1222 respectively. As a result, the improvement would be $$\frac{\text{cost}(P) - \text{cost}(P')}{\text{cost}(P)} = 40\%$$

it index $F_1$ 1218 were built. Algorithm 3 shown herein below illustrates an embodiment of "what if" utility 1210:

---
Algorithm 3: "what if" utility

Input: q: a query
  $\mathcal{J}$: a set of hypothetical indexes
Output: cost(q): estimated cost if $\mathcal{J}$ was built.
1: Main:
2:   P ← PlanByOptimizer(q);
3:   P' ← ReplaceScansByHypotheticalIndexes(P, $\mathcal{J}$);
4:   cost(P') ← EstimateCost(P');
5:   return cost(P');
6:
7:   ReplaceScansByHypotheticalIndexes(P, $\mathcal{J}$):
8:   foreach hypothetical index I ∈ $\mathcal{J}$ do
9:   | if I can be matched by FilterIndexRule or JoinIndexRule over P then
10:  | | Replace the corresponding scan in P by I;
11:  Return the plan P' after replacement;

---

There are various ways by which a cost model may estimate the query cost of a plan. In a size-based cost model as outlined above, one may rely on metadata stored in file system to obtain sizes for base table/index files. In the example described above in conjunction with FIG. 12, the sizes of both R and index $F_1$ 1218 may be obtained in this way. Estimating the output size of other operators may generally be accomplished by estimating the cardinality and/or selectivity of the operators (e.g., estimating the fraction of rows in a table that meet the conditions of a predicate filter). Selectivity of operators may be determined gather statistics regarding the workload and use compact data structures (e.g., histograms, sketches, random samples) to summarize the statistics. However, gathering statistics over large data is time-consuming. Moreover, it may be difficult to maintain such statistics to prevent them from becoming stale due to data updates.

Alternatively, heuristics may be employed whereby selectivity values are assigned to operators. For example, for operators whose output sizes are the same of their input sizes, such as a sort, their selectivity is simply 1.0; for the other operators such as filter or join, their selectivity may be set as 0.1.

It should be noted that the exact value of the cost estimate generated by a cost model is not terribly important for the purposes of "what-if" utility 1210. That is, having a true and accurate cost estimate is not as important as the comparability of any two estimates. It suffices if a cost model can accurately determine which of two query plans has the higher cost.

Having provided a high-level description of "what-if" utility 1210 in the context of architectural schematic 1200 of FIG. 12A, description now turns to a detailed description of an embodiment of a cost-based approach to index selection using "what-if" utility 1210. It should be noted, however, that "what if" utility 1210 has its own benefits beyond its role in index recommendation. Using "what if" utility 1210, users are able to assess the potential improvement of building a hypothetical index quantitatively, e.g., in terms of percentage. Such benefits, however, do not come for free—they lead to more accurate cost modeling and therefore increased overhead when collecting statistics.

Algorithm 4 implements one embodiment of the cost-based approach to index selection utilizing, for example, "what if" utility 1210 as embodied by Algorithm 3, and as shown herein immediately below:

---
Algorithm 4
---
Input: $\mathcal{W} = \{q_1, \ldots, q_n\}$: a workload of queries;
$\mathcal{I} = \{I_1, \ldots, I_n\}$: candidate indexes from Algorithm 1;
K: the number of indexes to be returned.
Output: The best K indexes from $\mathcal{I}$.
1: bestIndexes ← ∅;
2: minCost ← $\Sigma_{i=1}^n$ optimizerCost($q_i$);
3: foreach subset $\mathcal{S} \subseteq \mathcal{I}$ up to size K do
4:    cost($\mathcal{W}, \mathcal{S}$) ← $\Sigma_{i=1}^n$ whatIf($q_n, \mathcal{S}$) by Algorithm 3;
5:    if cost($\mathcal{W}, \mathcal{S}$) < minCost then
6:       bestIndexes ← $\mathcal{S}$;
7:       minCost cost($\mathcal{W}, \mathcal{S}$);
8: return bestIndexes;

Algorithm 4 accepts as input a workload of queries $\mathcal{W}$, a set of candidate indexes $\mathcal{I}$ as enumerated by Algorithm 1, and the number of indexes K to return. Each subset up to size K is enumerated (at line 3), and for each such subset $\mathcal{S}$, "what if" utility 1210 is invoked to obtain estimated cost of each $q_i \in \mathcal{W}$ as if the hypothetical indexes in $\mathcal{S}$ were built (line 4). If the sum of the estimated cost cost(W, $\mathcal{W}$) for the workload $\mathcal{W}$ is lower than the lowest cost currently recorded, we mark $\mathcal{S}$ as the best indexes and update the lowest cost so far (lines 5 to 7). Finally, the overall best subset found with the minimum estimated cost is returned (line 8). Note, summing the costs returned by the invocations of whatIf($q_n$, $\mathcal{S}$) as shown at line 4 is just one example of combining query costs to compute the workload cost. In an alternative embodiment, for example, one may further assign a weight (e.g., with respect to the frequency) to each query and thereafter compute a "weighted sum" when combining the query costs.

Algorithm 4 exhaustively searches for and returns the best index configuration of the candidate indexes (i.e., the subset of candidate indexes up to size K having the lowest estimated cost). Sometimes, however, the number of subsets may be huge (when there are a large number of candidate indexes) and Algorithm 4 may not be efficient in such cases. Other embodiments, as described in further detail herein below, may instead employ heuristic searching techniques that evaluate only some of the candidate index configurations.

For example, Algorithm 5 implements one embodiment of an alternative cost-based approach to index selection utilizing, for example, "what if" utility 1210 as embodied by Algorithm 3, and as shown herein immediately below:

---
Algorithm 5
---
Input: $\mathcal{W} = \{q_1, \ldots, q_n\}$: a workload of queries
$\mathcal{I} = \{I_1, \ldots, I_m\}$: candidate indexes.
Output: $C^{best}$: the best index configuration found
1:   $C^{best}$ ← ∅;
2:   $c^{min}$ ← EstimateCost($\mathcal{W}, \emptyset$);
3:   $\mathcal{R}$ ← $\mathcal{I}$;
4:   done ← false;
5:   while done == false do
6:     $C_{current}$ ← $C^{best}$;
7:     $c_{current}$ ← $c^{min}$;
8:     foreach index i ∈ $\mathcal{R}$ do
9:       C ← $C^{best}$ ∪ {i};
10:      c ← $\Sigma_{i=1}^n$ whatIf($q_n$, C) by Algorithm 3;
11:      if c < $c_{current}$ then
12:        $c_{current}$ ← c;
13:        $C_{current}$ ← C;
14:     If $C_{current}$ != $C^{best}$ then
15:       $C^{best}$ ← $C_{current}$;
16:       $c^{min}$ ← $c_{current}$;
17:       $\mathcal{R}$ ← $\mathcal{R}$ - $C_{current}$;
18:     else
19:       done ← true;
20:   return $C^{best}$;

Algorithm 5 will now be described with reference to FIGS. 13 and 14 which depict a hierarchical graph 1300 of a search space of a set of candidate indexes, and a pruned hierarchical graph 1400, respectively, comprising the hierarchical graph 1300 of FIG. 13 pruned of edges and nodes thereby reflecting the search path through the search space, according to an embodiment.

Regardless of the search strategy employed, one may represent the search space as a lattice and then prune the lattice as the search proceeds. The lattice is a hierarchical graph that captures the subsumption relationships between index configurations. There is an edge between two index configurations C and C' if C ⊂ C'. For example, consider hierarchical graph 1300 of FIG. 13.

Here, assume that three candidate indexes $\{i_1, i_2, i_3\}$ were returned by the index recommendation engine (e.g., as generated by Algorithm 1 as discussed herein above). As a result, there are eight possible subsets ∅, $\{i_1\}$, $\{i_2\}$, $\{i_3\}$, $\{i_1, i_2\}$, $\{i_2, i_3\}$, $\{i_1, i_3\}$ and $\{i_1, i_2, i_3\}$. Each subset is referred to herein as an 'index configuration,' and corresponds to index configurations $C_0$-$C_7$ as shown in FIG. 13 (and labeled 1302-1316 therein). As shown in FIG. 13, we can naturally organize the index configurations using a lattice based on their containment relationships (i.e., ⊂). Specifically, if two index configurations C and C' if C ⊂ C', then C is a descendent of C' and C' is an ancestor of C. Note that ∅ is also a valid index configuration, which basically means that none of the candidate indexes would be beneficial and therefore none of them should be built.

Based on the lattice representation, we can easily represent the search space of index recommendation by pruning index configurations that are not explored. As an example, consider the bottom-up search strategy presented in Algorithm 5 shown above. Algorithm 5 begins by enumerating 1-subsets (i.e., configurations with 1 index). For each such configuration, Algorithm 5 invokes "what if" utility 1210 for each query of the workload and sums the results (at line 10) to estimate the cost for the workload if that particular configuration was built/materialized (in the manner described herein above in relation to Algorithm 5). Algorithm 5 then chooses the best 1-subset (i.e. the index configuration having the lowest estimated cost), and thereafter considers all 2-subsets that extend from the best 1-subset. Note that not all 2-subsets will be considered since the greedy nature of Algorithm 5 means the only 2-subsets considered are those that extend from the best 1-subset. For each such 2-subset to be considered (i.e., those that extend from the best 1-subset), "what if" utility 1210 is again invoked to determine the estimated cost for each index configuration corresponding to a 2-subset.

Algorithm 5 continues in this same general fashion by enumerating and considering the 3-subsets that extends from the best 2-subset. The search procedure stops either at some predetermined hierarchical level corresponding to a k-subset, or terminates when adding one more index does not reduce the cost versus the prior level (i.e., adding an index at level n+1 has a cost greater than the best index configuration from level n).

Figure 13:
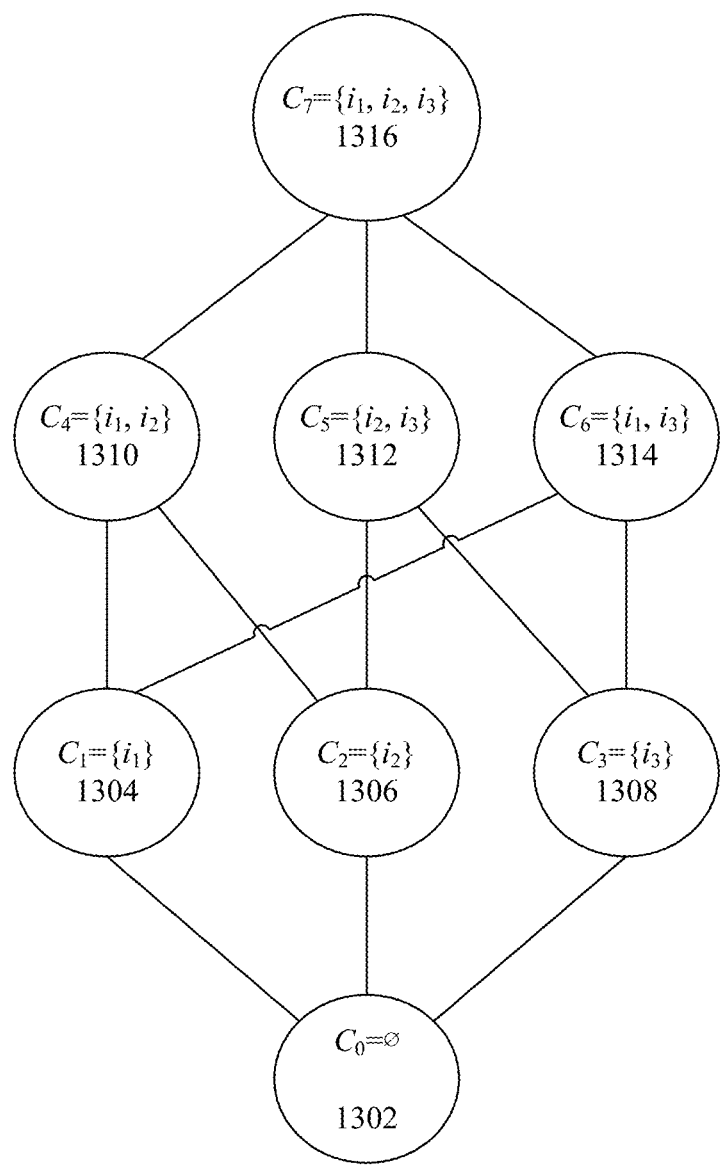
FIG. 13 depicts a hierarchical graph of a search space of a set of candidate indexes, according to an embodiment.
Figure 14:
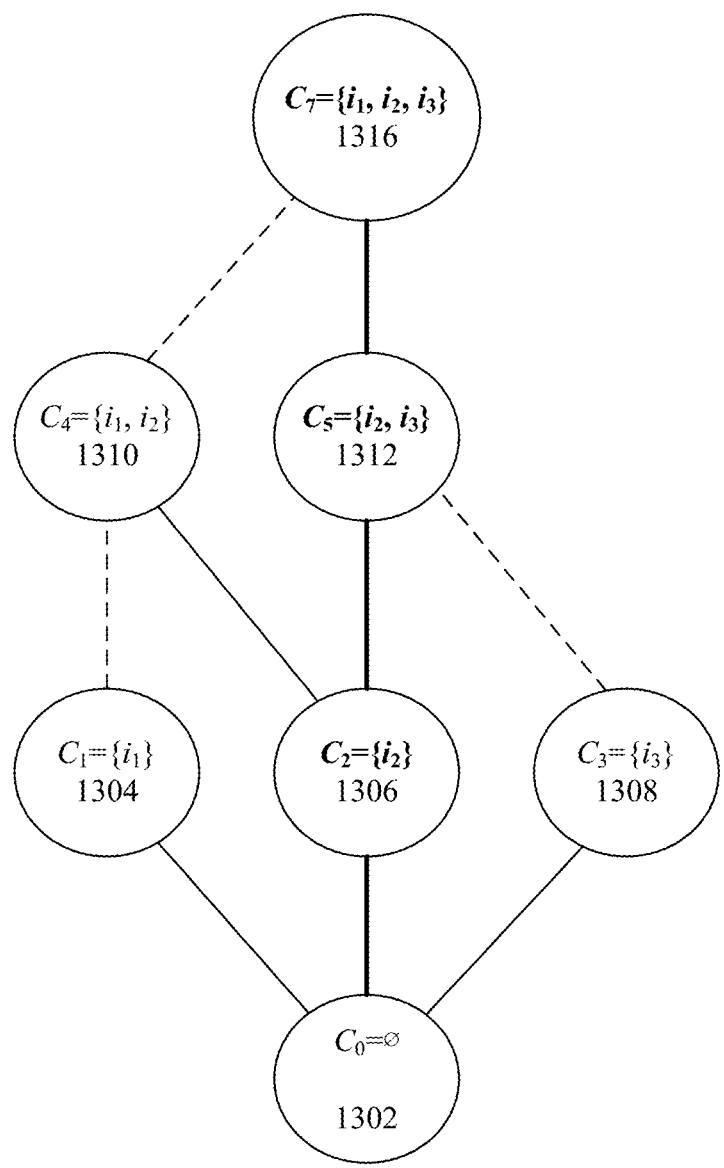
FIG. 14 depicts a pruned hierarchical graph comprising the hierarchical graph of FIG. 13 pruned of edges and nodes thereby reflecting the search path through the search space, according to an embodiment.

Pruned hierarchical graph 1400 of FIG. 14 depicts the graph that results from application of Algorithm 5 to hierarchical graph 1300 of FIG. 13, wherein the nodes and edges corresponding to index configurations that were not considered by the search have been pruned from the graph. Recall from the description above, that hierarchical graph 1300 of FIG. 13 comprises the enumeration of index configurations $C_0$-$C_7$ 1302-1316, respectively, constructed as subsets of the set of indexes $\{i_1, i_2, i_3\}$, and where the best k-subset (for k $\in \{1, 2, 3\}$) at each hierarchical level is shown in bold type.

Comparing FIGS. 13 and 14, it is apparent that index configuration $C_6$ 1314 is never explored and therefore is absent in FIG. 14 since Algorithm 5 pruned that node from hierarchical graph 1300. index configuration $C_6$ $\{i_1, i_3\}$ 1314 is never explored because when Algorithm 5 explored 1-subsets (i.e., index configurations with just a single index), the best configuration turned out to be index configuration $C_2$ $\{i_2\}$ 1306 which is in turn used as the starting point for exploring 2-subsets (i.e., index configurations with 2 indexes). Of course, indexes included in index configuration $C_2$ 1306 (i.e., index $i_2$) can only appear in 2-subsets that include such indexes. Therefore, in this example, Algorithm 5 will only explore 2-subsets that include index $i_2$. index configuration $C_6$ 1314, however, does NOT include index $i_2$ since it comprises the set $\{i_1, i_3\}$. Accordingly, index configuration $C_6$ 1314 is pruned from hierarchical graph 1300 by Algorithm 5 when producing pruned graph 1400 of FIG. 14.

Pruned graph 1400 of FIG. 14 also illustrates (by way of the dashed lines) the edges of hierarchical graph 1300 that are not traversed by the search strategy. For example, the dashed edge between index configuration $C_3$ 1308 and index configuration $C_5$ 1312 illustrates that although both the index configurations $C_3$ 1308 and $C_5$ 1312 are explored during the search, the bottom-up search strategy does not traverse through to index configuration $C_5$ 1312 from index configuration $C_3$ 1308 via the edge between them. This is because the search of Algorithm 5 arrived at index configuration $C_5$ 1312 by virtue of the fact that index configuration $C_5$ 1312 is explored because it includes index $i_2$, the index found to have the lowest estimated cost amongst the 1-subsets.

It should be noted that the bottom-up search strategy exemplified by Algorithm 5 is purely for the purposes of illustration, and other embodiments may employ other search strategies. For example, an embodiment my employ a top-down strategy that starts from the top of the lattice (e.g., index configuration $C_7$ 1316 of FIG. 13) and considers k-subsets with decreasing k's.

Algorithm 5 concludes by providing not only a recommended index configuration to be built (i.e., the index configuration having the lowest estimated cost for the workload), but also a pruned graph such as, for example, pruned graph 1400 of FIG. 14. Embodiments are enabled thereafter to permit exploration of the search that led to the recommended index configuration to help explain how that index configuration was recommended. Of course, building the indexes of the recommended index configuration, and thereafter leveraging such built indexes when servicing workload queries optimizes the system inasmuch as fewer computing resources (CPU cycles, memory, disk I/O and/or network bandwidth) are required. However, explanations of how the recommended index configuration was arrived at may enable yet further optimization in at least a few ways.

For example, and as illustrated by the embodiments described above, index recommendations are often based on query execution cost modeling, which is difficult and error-prone. It may therefore be the case that, due to cost modeling errors, the recommended index configuration actually causes query performance regression instead of improvement, or is not optimal (i.e., using another index configuration would lead to a better performance improvement). In such situations, a systematic explanation of the index recommendation procedure itself (as reflected, e.g., by pruned graph 1400 of FIG. 14) may help users detect where the errors come from and then either update the cost model to eliminate the error and/or build the indexes of an index configuration other than the recommended index configuration.

In another example, as described in part above, the process of generating index recommendations is tied to the physical layout of the data (e.g., data partitioning). After exploring the index recommendation procedure, it may be possible to detect that a different data layout may lead to further performance improvements over and above the baseline performance improvements offered by building and using the indexes of the recommended index configuration.

Embodiments enable the above described exploration/explanation of the search by storing the pruned graph (e.g., pruned graph 1400 of FIG. 14) and enabling graph queries to be performed over the graph. In one embodiment, pruned graph 1400 may be stored in and queried through a native graph database such as, for example, Neo4j or SQL Graph. Alternative embodiments may instead use a traditional native relational database engine. For the latter embodiments, one may use two relational tables to store the graph information: a node table and an edge table. The node table stores information about the explored index configurations in the pruned graph, whereas the edge table stores information about the edges between the nodes (i.e., index configurations). Consider, for example, pruned graph 1400 of FIG. 14. The node table for pruned graph 1400 will contain $C_0$, $C_1$, $C_2$, $C_3$, $C_4$, $C_5$, $C_7$, and the edge table will contain ($C_0$; $C_1$), ($C_0$; $C_2$), ($C_0$; $C_3$), ($C_2$; $C_4$), ($C_2$; $C_5$), and ($C_5$; $C_7$). The basic schema for the node and edge tables can be represented as follows:

nodes(id, node-metadata);
    edges(from_node_id, to_node_id, edge-metadata).

As shown in the schema defined above, nodes and edges may also be associated with metadata. For example, the metadata of a node corresponding to an index configuration may include (but is not limited to) the following:

The indexes in the configuration (i.e., the $C_i$'s);
    The indexes in the configuration that are actually used by the query plan;
    The estimated cost of using the index configuration;
    The query plan when the configuration is used;

The level of the node in the pruned graph.

Having stored a pruned graph such as pruned graph 1400 of FIG. 14, and as mentioned above, the pruned graph may be queried. For example, supposing the nodes and edges are stored in relational tables in the manner described herein above, embodiments may perform SQL-like queries such as shown below (wherein n and e are a nodes and edges table, respectively, defined according to the schema shown above, and the recommended index configuration was determined to be $C_5$):

```
Return the set of immediate children of C₅
SELECT e.from FROM e WHERE e.to = 'C5'
Return the best immediate child (i.e., immediate child having the lowest
cost) of C₅
    SELECT e.from FROM e JOIN n
    WHERE e.to = n.id AND n.id = 'C5'
    ORDER BY n.cost
    LIMIT 1
```

Embodiments are enabled to permit virtually any type of graph query. For example, graph queries may include graph neighborhood queries, graph path queries, ranking queries, filtering queries, and others. Graph neighborhood queries may include, but are not limited to, those that answer the following types of questions:

(GNQ1) What are the immediate children of the recommended index configuration?
(GNQ2) What is the best immediate child of the recommended index configuration?
(GNQ3) What are the siblings of the recommended index configuration, if any?
(GNQ4) What is the best sibling of the recommended index configuration, if any?
(GNQ5) What are the immediate parents of the recommended index configuration, if any?
(GNQ6) What is the best immediate parent of the recommended index configuration, if any?

With reference to pruned graph 1400 of FIG. 14 and the running example discussed herein above, the answers to the queries shown immediately herein above are the following:

(GNQ1) The set of immediate children of $C_5$ is $\{C_2\}$.
(GNQ2) The best immediate child of $C_5$ is $C_2$.
(GNQ3) The set of siblings of $C_5$ is $\{C_4\}$.
(GNQ4) The best sibling of $C_5$ is $C_4$.
(GNQ5) The set of immediate parents of $C_5$ is $\{C_7\}$.
(GNQ6) The best immediate parent of $C_5$ is $C_7$.

Graph path queries may include, but are not limited to, those that answer the following types of questions:

(GPQ1) Return the path that consists of the best configurations found in each hierarchical level of Algorithm 5.
(GPQ2) Return the path that consists of the best configurations found in the last two hierarchical levels (or last n hierarchical levels) of Algorithm 5.

With reference to pruned graph 1400 of FIG. 14 and the running example discussed herein above, the answers to the queries shown immediately herein above are the following:

(GPQ1) The path is $\{C_0, C_2, C_5, C_7\}$.
(GPQ2) The path is $\{C_5, C_7\}$.

Ranking queries may include, but are not limited to, those that answer the following types of questions:

(RQ1) Rank the immediate children of the recommended index configuration by their estimated or actual costs.
(RQ2) Rank the siblings of the recommended index configuration by their estimated or actual costs.
(RQ3) Rank the immediate parents of the recommended index configuration by their estimated or actual costs.

Filtering queries may include, but are not limited to, those that answer the following types of questions:

(FQ1) Find all configurations that have been explored and are within ±10% of the execution cost of the best configuration.
(FQ2) Find all configurations that have been explored and are within ±10% of the execution cost of the best configuration, and have no more than 5 indexes.

It should be understood that the above described queries are merely exemplary, and many other types of queries over graphs such as pruned graph 1400 of FIG. 14 are possible as known by the ordinarily skilled artisan.

Figure 15:
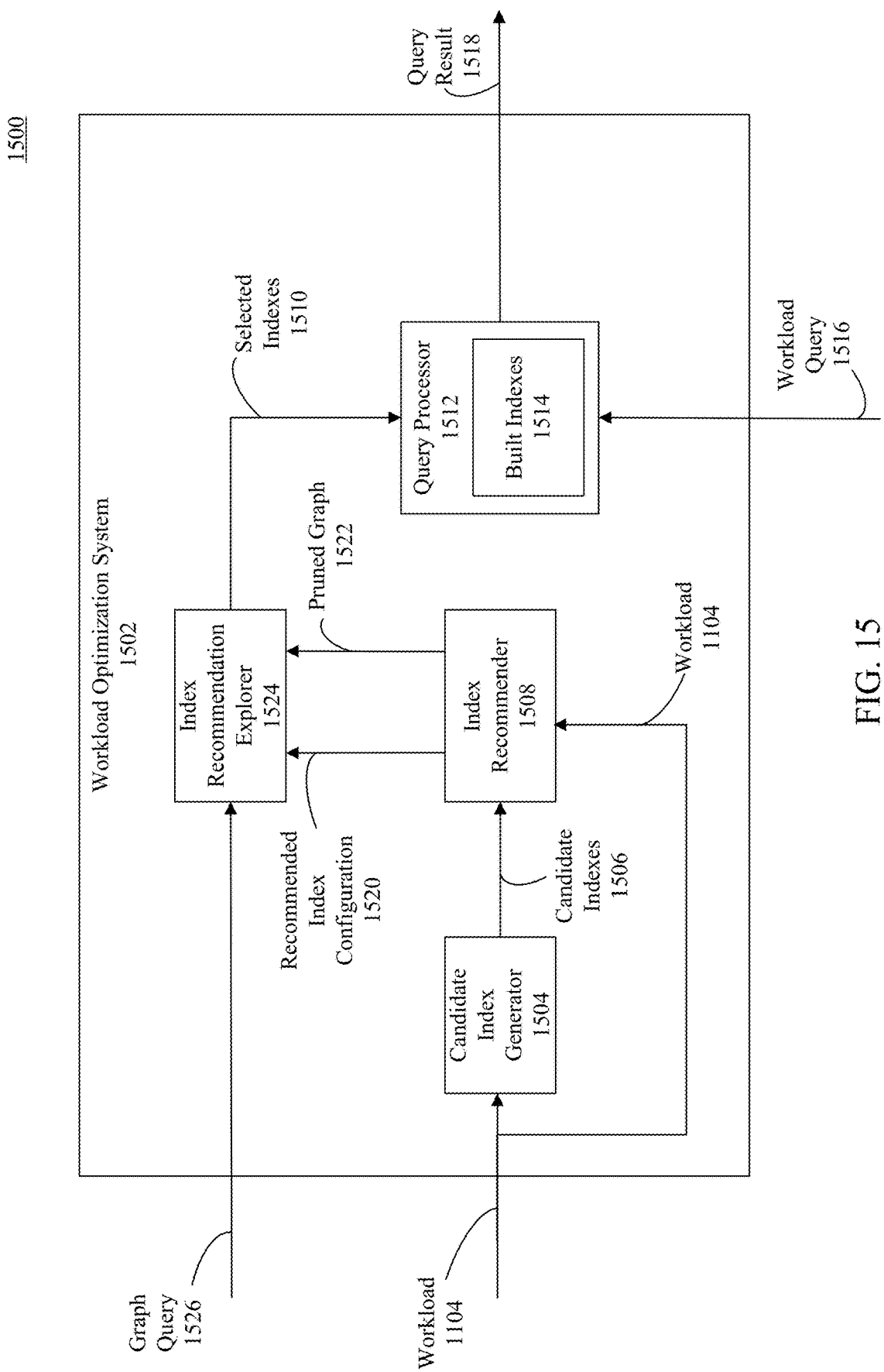
FIG. 15 depicts a detailed schematic view of a workload optimization system, according to an embodiment.

Embodiments of a workload optimization system may be implemented in various ways to generate index recommendations that would benefit a workload, to build and use such indexes for servicing the queries of the workload, to enable exploration the index generation search space to detect optimization opportunities, and to thereafter enable such optimizations. For example, FIG. 15 depicts a detailed schematic view 1500 of a workload optimization system 1502, according to an embodiment. As shown in FIG. 15, workload optimization system 1502 includes a candidate index generator 1504, an index recommender 1508, an index recommendation explorer 1524 and a query processor 1512. Other structural and operational embodiments will be apparent to persons skilled in the relevant art(s) based on the following discussion regarding workload optimization system 1502 as depicted in FIG. 15.

As an initial matter, and as described above, workload optimization system 1502 as shown in FIG. 15 is configured to receive a workload such as, for example, workload 1104 of FIG. 11, which comprises a plurality of queries, and to pass workload 1104 to candidate index generator 1504. Candidate index generator 1504 is configured to extract sets of indexable columns from the queries of workload 1104 in numerous ways. In an embodiment, for example, indexable columns may be extracted from the queries of workload 1104 per Algorithm 1 as described herein above. Candidate index generator 1504 is further configured to thereafter generate a set of candidate indexes 1506 based on the sets of indexable columns. For example, candidate indexes 1506 may be generated from the sets of indexable columns per Algorithm 1.

The generated candidate indexes 1506 are thereafter passed to index recommender 1508. index recommender 1508 is configured to select which index or indexes of candidate indexes 1506 would provide the greatest performance benefit when executing the queries of workload 1104, and to generate pruned graph 1522. Pruned graph 1522 and the selected indexes (in the form of recommended index configuration 1520) are thereafter provided to index recommendation explorer 1524. index recommender 1508 may select the best indexes and generate pruned graph 1522 in a number of ways. For example, index recommender 1508 may employ the heuristic search of Algorithm 5as described herein above to apply a cost-based approach utilizing the "what-if" utility 1210 of FIG. 12. For example, index recommender 1508 may employ an embodiment of "what-if" utility 1210 that implements Algorithm 3 as described above. Likewise, index recommender 1508 may generate pruned graph 1522 when performing, for example, the heuristic search of Algorithm 5 as described herein above. index recommender 1508 thereafter passes recommended index configuration 1520 and pruned graph 1522 to index recommendation explorer 1524.

index recommendation explorer 1524 is configured to accept recommended index configuration 1520, pruned graph 1522 and graph query 1526. index recommendation explorer 1524 may then execute graph query 1526 against pruned graph 1522 to generate a graph query result that for the basis for a subsequent optimization operation. For example, the graph query result may be used at least in part to detect that the actual cost of an index configuration different than the recommended index configuration is less than the estimated cost of the recommended index configuration, detect that the estimated cost differs from a determined actual cost for the recommended index configuration by a predetermined amount or detect that the physical data layout of the underlying data is sub-optimal. With respect to these detections, subsequent optimization operations may comprise, for example, selecting a different index configuration to build, modifying the cost-based model and reorganizing the physical data layout, respectively. The above described types of problems and corresponding optimizations are mere examples, and one ordinarily skilled in the art readily understands how embodiments may be employed to explore the index recommendation process, and to perform further optimizations as a result.

Having selected indexes to be built (whether in the form of recommended index configuration 1520 or a different index configuration chosen incident to an optimization operation), such indexes are provided as selected indexes 1510 to query processor 1512 to be built. Query processor 1512 is further configured to build the indexes included in selected indexes 1510 to provide built indexes 1514, to receive a workload query 1516, to generate a query plan optimized to use one or more of built indexes 1514, and to execute the query plan to produce a query result. For example, built indexes 1514 may be built from selected indexes 1510 by building a table including one or more key columns (i.e., the "indexed columns" as described in detail herein above in the description of Algorithm 1), and one or more data columns corresponding to the "included columns."

After receiving workload query 1516, query processor 1512 is configured to generate a query plan for the query wherein, wherever possible, the query plan is modified to reference one or more of built indexes 1514 by using the FilterIndexRule and JoinIndexRule, and in the manner described above in conjunction with FIGS. 9 and 10. Query processor 1512 may thereafter execute the modified query plan to produce the final query result.

Figure 16:
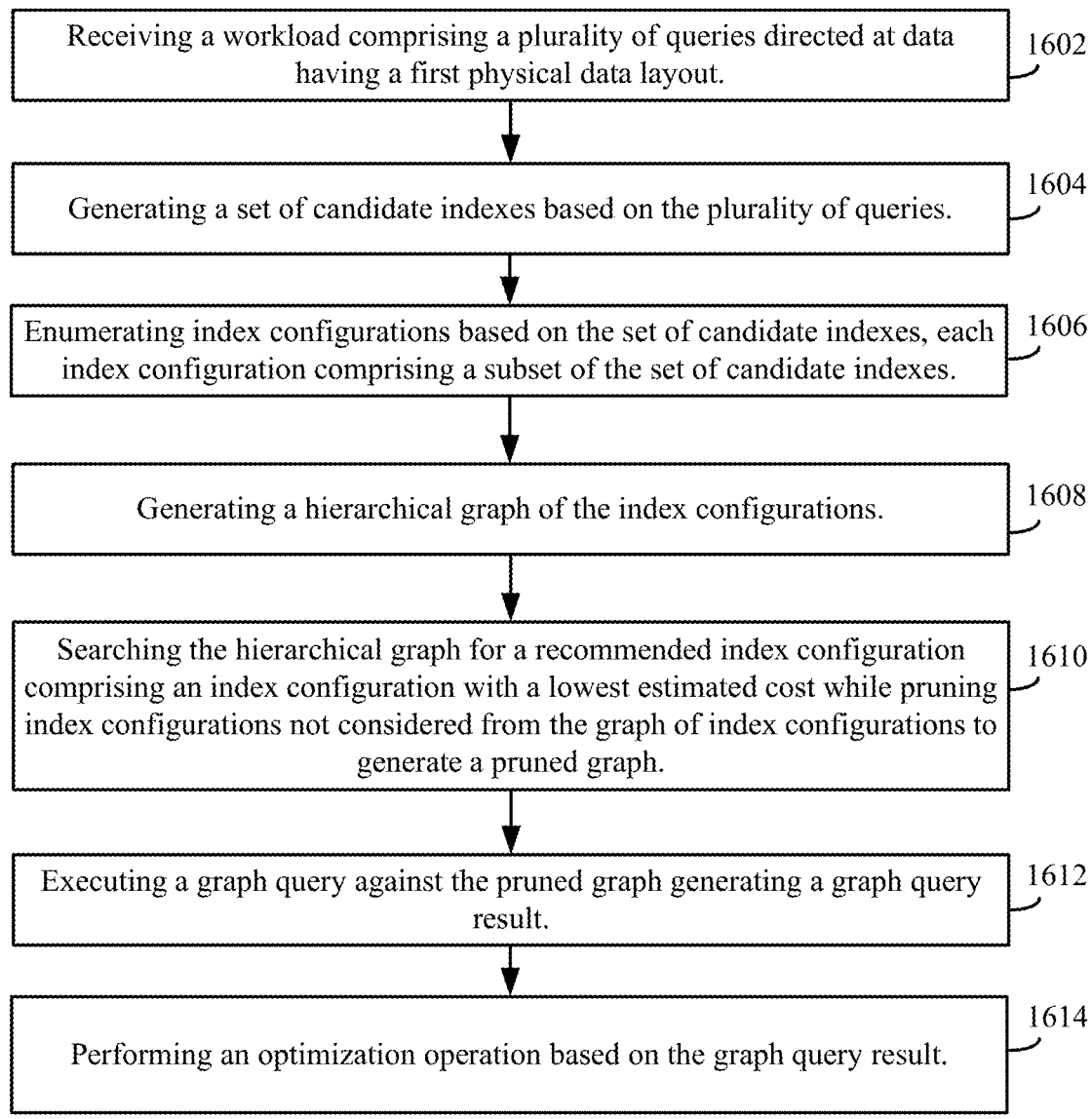
FIG. 16 depicts a flowchart of a method for workload optimization in a distributed query processing system, according to an embodiment.

Further operational aspects of workload optimization system 1502 of FIG. 15 is described in conjunction with FIG. 16 which depicts a flowchart 1600 of a method for workload optimization in a distributed query processing system, according to an embodiment. In an embodiment, flowchart 1600 may be performed by workload optimization system 1502 of FIG. 15. Although described with reference to workload optimization system 1502 as shown in FIG. 15, the method of FIG. 16 is not limited to that implementation. Other structural and operational embodiments will be apparent to persons skilled in the relevant art(s) based on the following discussion regarding flowchart 1600 of FIG. 16.

Flowchart 1600 is an example method for workload optimization in a distributed query processing system, according to an embodiment. Note that flowchart 1600 may be triggered to optimize a distributed query processing system workload in various ways. For example, optimization may be triggered in response to an express request from a system administrator or automatically (e.g., based on changes to the average system workload over time, or substantial changes to the underlying data).

Flowchart 1600 begins at step 1602. At step 1602, a workload is received, the workload comprising a plurality of queries directed at data having a first physical data layout. For example, and with reference to workload optimization system 1502 of FIG. 15, candidate index generator 1504 may be configured to receive workload 1104. Flowchart 1600 of FIG. 16 continues at step 1604.

In step 1604, a set of candidate indexes is generated based on the plurality of queries. For example, For example, and with continued reference to workload optimization system 1502 of FIG. 15, candidate index generator 1504 may be configured to generate candidate indexes based on sets of indexable columns in the manner described in detail above regarding workload optimization system 1502 of FIG. 15, the detailed description of FIG. 11, and Algorithm 1 and its detailed description, in an embodiment. Flowchart 1600 continues at step 1606.

At step 1606, index configurations based on the set of candidate indexes are enumerated, each index configuration comprising a subset of the set of candidate indexes. For example, and with continued reference to workload optimization system 1502 of FIG. 15, index recommender 1508 may be configured to enumerate every unique combination of candidate indexes, each combination comprising an index configuration, and as described further herein above.

At step 1608, a hierarchical graph of the index configurations is generated. For example, and with continued reference to workload optimization system 1502 of FIG. 15, index recommender 1508 may be configured to generate a hierarchical graph that captures the subsumption relationships between the index configurations as described above, and as illustrated in example hierarchical graph 1300 of FIG. 13. Flowchart 1600 continues at step 1610.

At step 1610, the hierarchical graph is searched for a recommended index configuration comprising an index configuration with a lowest estimated cost while pruning index configurations not considered from the graph of index configurations to generate a pruned graph. For example, and with continued reference to workload optimization system 1502 of FIG. 15, index recommender 1508 may be configured to search the hierarchical graph generated at step 1608 for the best index configuration, while simulteously generating a pruned graph such as, for example, pruned graph 1522. More specifically, index recommender 1508 may operate in the manner described in detail above regarding workload optimization system 1502 of FIG. 15 and Algorithm 5. and their respective detailed descriptions. Flowchart 1600 continues at step 1612.

At step 1612, a graph query is executed against the pruned graph generating a graph query result. For example, and with continued reference to workload optimization system 1502 of FIG. 15, index recommendation explorer 1524 may be configured to receive graph query 1526, and to perform such query against pruned graph 1522 to generate a graph query result. Graph query 1526 may comprise, for example, any of the various types of graph queries described herein above. Flowchart 1600 concludes at step 1614.

At step 1614, an optimization operation is performed based on the graph query result. For example, and with continued reference to workload optimization system 1502 of FIG. 15, index recommendation explorer 1524 may provide the graph query result to a system administrator or an automated system for analysis to detect optimization opportunities as described above, and to enable a corresponding optimization operation to thereafter be performed (e.g., selecting an index configuration to build that is different than recommended index configuration 1520).

In the foregoing discussion of steps 1602-1614 of flowchart 1600, it should be understood that at times, such steps may be performed in a different order or even contemporaneously with other steps. For example, the search of the hierarchical graph at step 1610 may begin (assuming the search being performed is a bottom-up search) as soon as the lowest level of the hierarchical graph (i.e., the level including only the 1-subset indexes) is generated, with performance estimates being performed for each index while the higher levels of hierarchical graph continue to be generated at step 1608. Other operational embodiments will be apparent to persons skilled in the relevant art(s). Note also that the foregoing general description of the operation of workload optimization system 1502 of FIG. 15 is provided for illustration only, and embodiments of workload optimization system 1502 may comprise different hardware and/or software, and may operate in manners different than described above. Indeed, steps of flowchart 1600 may be performed in various ways.

Figure 17:
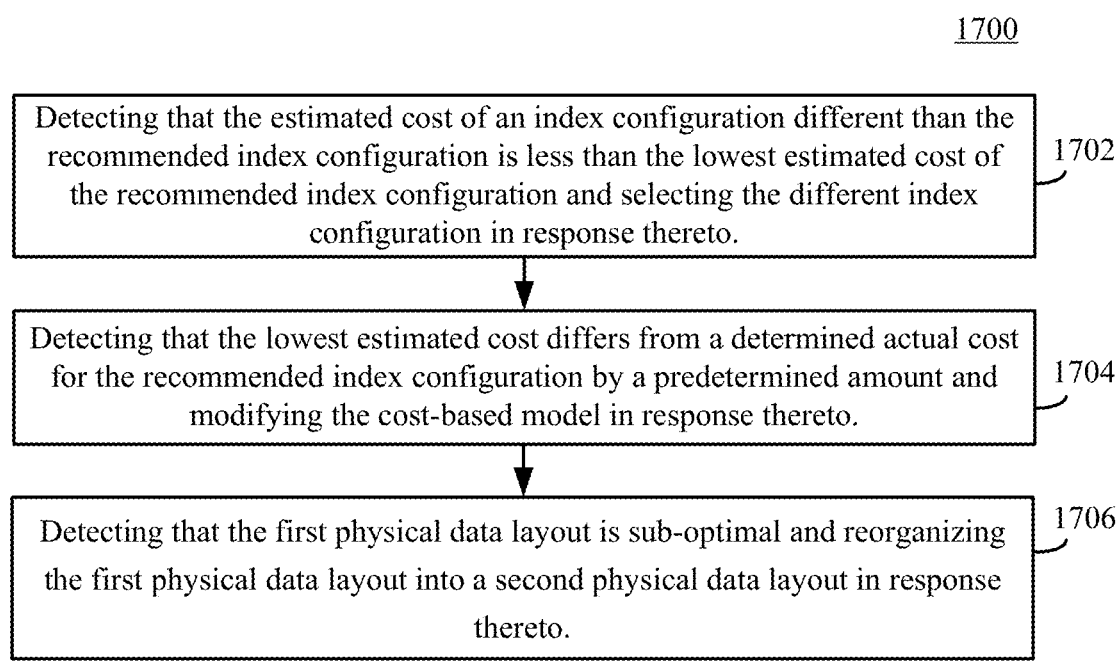
FIG. 17 depicts a flowchart of a refinement to the flowchart of FIG. 16 for performing optimization operations accordingly to a graph query result, according to an embodiment.

For example, FIG. 17 depicts a flowchart 1700 of a refinement to flowchart 1600 of FIG. 16 for performing optimization operations accordingly to a graph query result, according to an embodiment. Accordingly, flowchart 1700 of FIG. 17 will also be described with continued reference to workload optimization system 1502 of FIG. 15. However, other structural and operational embodiments will be apparent to persons skilled in the relevant art(s) based on the following discussion regarding flowchart 1700.

Flowchart 1700 begins at step 1702. At step 1702, the estimated cost of an index configuration different than the recommended index configuration is detected to be less than the estimated cost of the recommended index configuration, and a different index configuration is selected in response thereto. For example, and with continued reference to workload optimization system 1502 of FIG. 15, index recommendation explorer 1524 may enable costs to be estimated for different index configurations not considered by the heuristic search of Algorithm 5, and where the estimate for such an index configuration is found to be less than the cost of recommended index configuration 1520, the different index configuration may be selected to be built. Flowchart 1700 of FIG. 17 continues at step 1704.

In step 1704, the estimated cost is detected to differ from a determined actual cost for the recommended index configuration by a predetermined amount and the cost-based model is modified in response thereto. For example, and with reference to workload optimization system 1502 of FIG. 15, query processor 1512 may accept selected indexes 1510 and build such indexes and the actual cost of performing one or more queries may be determined. As discussed above, index recommendation explorer 1524 is enabled to permit the inspection of the metadata for each index configuration, including the estimated cost for the configuration. The determined actual cost and estimated cost for an index configuration may then be compared. Where the difference between the actual and estimated cost exceeds a predetermined amount or percentage, the cost-based model may be inspected and/or debugged to determine any source of error, and the cost-based model updated accordingly.

Flowchart 1700 of FIG. 17 concludes at step 1706. In step 1706, the first physical data layout is detected to be sub-optimal and in response the first physical data layout into a second physical data layout in response thereto. For example, and with reference to workload optimization system 1502 of FIG. 15, index recommendation explorer 1524 may enable the detection of a sub-optimal data layout by inspecting pruned graph 1522 via suitable queries, as described in detail above. In response, the data layout may be revised to improve system performance.

In the foregoing discussion of steps 1702-1706 of flowchart 1700, it should be understood that at times, such steps may be performed in a different order or even contemporaneously with other steps. Other operational embodiments will be apparent to persons skilled in the relevant art(s).

Figure 18:
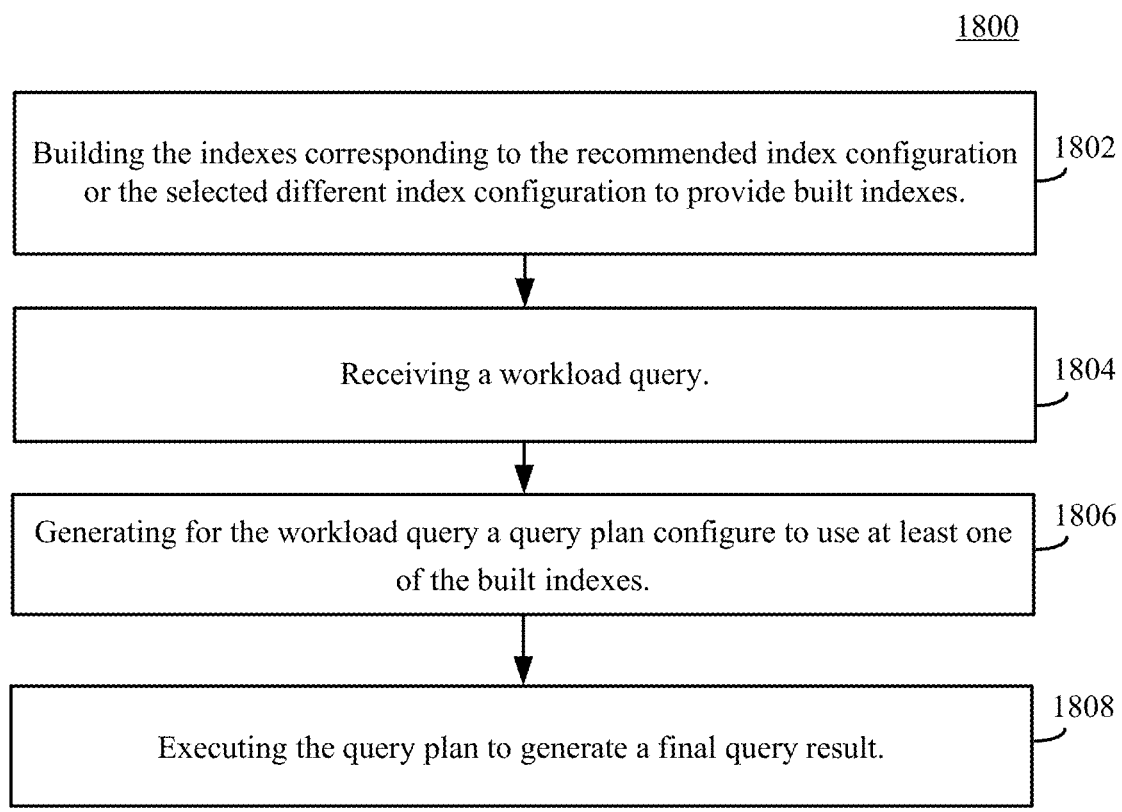
FIG. 18 depicts a flowchart of a refinement to the flowchart of FIG. 17 for building indexes of an index configuration and executing queries that take advantage of such indexes, according to an embodiment.

FIG. 18. depicts a flowchart 1800 of a refinement to the flowchart of FIG. 16 for building indexes of an index configuration and executing queries that take advantage of such indexes, according to an embodiment. Accordingly, flowchart 1800 of FIG. 18 will also be described with continued reference to workload optimization system 1502 of FIG. 15. However, other structural and operational embodiments will be apparent to persons skilled in the relevant art(s) based on the following discussion regarding flowchart 1800.

At step 1802, the indexes corresponding to the recommended index configuration or the selected different index configuration are built to provide built indexes. For example, and with continued reference to workload optimization system 1502 of FIG. 15, query processor 1512 may be configured to accept selected indexes 1510 from index recommendation explorer 1524, wherein selected indexes 1510 comprises either recommended index configuration 1520, or an alternative index configuration selected due to an optimization operation. Query processor 1512 thereafter may build such indexes to provide built indexes 1514 in the manner described above regarding workload optimization system 1502 of FIG. 15, and/or as known in the art. Flowchart 1800 continues at step 1804.

At step 1804, a workload query is received. For example, and with continued reference to workload optimization system 1502 of FIG. 15, query processor 1512 may receive workload query 1516 which may comprise a query of workload 1104 or any other query. Flowchart 1800 continues at step 1814.

In step 1806, a query plan for the workload query is generated, the query plan configured to use at least one of the built indexes. For example, and with continued reference to workload optimization system 1502 of FIG. 15, query processor 1512 may be configured to generate an intermediate query plan that is not configured to use any of the built indexes, and thereafter apply a FilterIndexRule and/or JoinIndexRule to the intermediate query plan to provide a query plan that is configured to use at least one of the built indexes as described in detail above regarding workload optimization system 1502 of FIG. 15, FilterIndexRule and/or JoinIndexRule particularly as described in conjunction with examples 900 and 1000 of FIGS. 9 and 10, respectively.

Flowchart 1800 of FIG. 18 concludes at step 1808. In step 1808, the query plan is executed to generate a final query result. For example, and with continued reference to workload optimization system 1502 of FIG. 15, query processor 1512 may be configured to execute the query plan generated in step 1806 to generate query result 1518. As known in the art, because the query plan was configured to use at least one of built indexes 1514, generating query result 1518 requires fewer system resources (e.g., storage space, CPU cycles and/or memory) than executing the above described intermediate query plan that is not configured to use built indexes 1514.

Other operational embodiments will be apparent to persons skilled in the relevant art(s). Note also that the foregoing general description of the operation of workload optimization system 1502 is provided for illustration only, and embodiments of workload optimization system 1502 may comprise different hardware and/or software, and may operate in manners different than described above.

III. Example Computer System Implementation

Each of data ingester 112, data digester 114, data modeler and server 116, query optimizer 1212, candidate index generator 1504, index recommender 1508, index recommendation explorer 1524 and/or query processor 1512, and flowcharts 1600, 1700 and/or 1800 may be implemented in hardware, or hardware combined with software and/or firmware. For example, data ingester 112, data digester 114, data modeler and server 116, query optimizer 1212, candidate index generator 1504, index recommender 1508, index recommendation explorer 1524 and/or query processor 1512, and flowcharts 1600, 1700 and/or 1800 may be implemented as computer program code/instructions configured to be executed in one or more processors and stored in a computer readable storage medium. Alternatively, data ingester 112, data digester 114, data modeler and server 116, query optimizer 1212, candidate index generator 1504, index recommender 1508, index recommendation explorer 1524 and/or query processor 1512, and flowcharts 1600, 1700 and/or 1800 may be implemented as hardware logic/electrical circuitry.

For instance, in an embodiment, one or more, in any combination, of data ingester 112, data digester 114, data modeler and server 116, query optimizer 1212, candidate index generator 1504, index recommender 1508, index recommendation explorer 1524 and/or query processor 1512, and flowcharts 1600, 1700 and/or 1800 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 19:
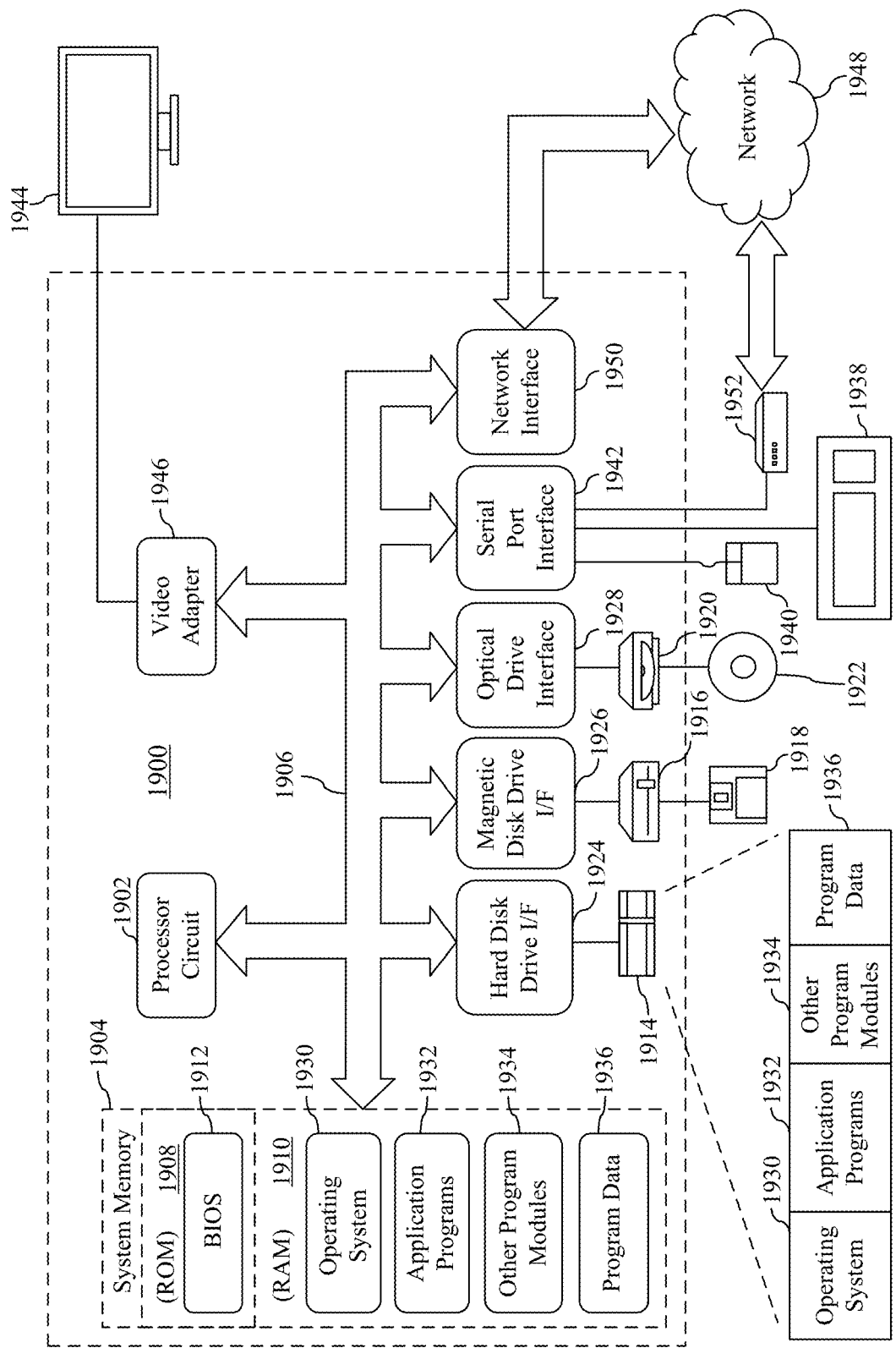
FIG. 19 is a block diagram of an example computer system in which embodiments may be implemented.

FIG. 19 depicts an exemplary implementation of a computing device 1900 in which embodiments may be implemented. For example, any of data ingester 112, data digester 114, data modeler and server 116, query optimizer 1212, candidate index generator 1504, index recommender 1508, index recommendation explorer 1524 and/or query processor 1512, and flowcharts 1600, 1700 and/or 1800 may be implemented in one or more computing devices similar to computing device 1900 in stationary or mobile computer embodiments, including one or more features of computing device 1900 and/or alternative features. The description of computing device 1900 provided herein is provided for purposes of illustration, and is not intended to be limiting. Embodiments may be implemented in further types of computer systems, as would be known to persons skilled in the relevant art(s).

As shown in FIG. 19, computing device 1900 includes one or more processors, referred to as processor circuit 1902, a system memory 1904, and a bus 1906 that couples various system components including system memory 1904 to processor circuit 1902. Processor circuit 1902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1902 may execute program code stored in a computer readable medium, such as program code of operating system 1930, application programs 1932, other programs 1934, etc. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computing device 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1930, one or more application programs 1932, other programs 1934, and program data 1936. Application programs 1932 or other programs 1934 may include, for example, computer program logic (e.g., computer program code or instructions) for implementing of data ingester 112, data digester 114, data modeler and server 116, query optimizer 1212, candidate index generator 1504, index recommender 1508, index recommendation explorer 1524 and/or query processor 1512, and flowcharts 1600, 1700 and/or 1800 (including any suitable step of flowcharts 1600, 1700 and/or 1800), and/or further embodiments described herein.

A user may enter commands and information into the computing device 1900 through input devices such as keyboard 1938 and pointing device 1940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1902 through a serial port interface 1942 that is coupled to bus 1906, but may be connected by other interfaces, such as a parallel port, game port, or a universal serial bus (USB).

A display screen 1944 is also connected to bus 1906 via an interface, such as a video adapter 1946. Display screen 1944 may be external to, or incorporated in computing device 1900. Display screen 1944 may display information, as well as being a user interface for receiving user commands and/or other information (e.g., by touch, finger gestures, virtual keyboard, etc.). In addition to display screen 1944, computing device 1900 may include other peripheral output devices (not shown) such as speakers and printers.

Computing device 1900 is connected to a network 1948 (e.g., the Internet) through an adaptor or network interface 1950, a modem 1952, or other means for establishing communications over the network. Modem 1952, which may be internal or external, may be connected to bus 1906 via serial port interface 1942, as shown in FIG. 19, or may be connected to bus 1906 using another interface type, including a parallel interface.

As used herein, the terms "computer program medium," "computer-readable medium," and "computer-readable storage medium" are used to refer to physical hardware media such as the hard disk associated with hard disk drive 1914, removable magnetic disk 1918, removable optical disk 1922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1932 and other programs 1934) may be stored on the hard disk, magnetic disk, optical disk, ROM, RAM, or other hardware storage medium. Such computer programs may also be received via network interface 1950, serial port interface 1942, or any other interface type. Such computer programs, when executed or loaded by an application, enable computing device 1900 to implement features of embodiments described herein. Accordingly, such computer programs represent controllers of the computing device 1900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method for workload optimization in a distributed query processing system is provided herein. The method comprising: receiving a workload comprising a plurality of queries directed at data having a first physical data layout; generating a set of candidate indexes based on the plurality of queries; enumerating index configurations based of the set of candidate indexes, each index configuration comprising a subset on the set of candidate indexes; generating a hierarchical graph of the index configurations; searching the hierarchical graph for a recommended index configuration comprising an index configuration with a lowest estimated cost while pruning index configurations not considered from the graph of index configurations to generate a pruned graph; executing a graph query against the pruned graph generating a graph query result; and performing an optimization operation based on the graph query result.

In an embodiment of the foregoing method, the graph query comprises one of: a graph neighborhood query, a graph path query, a ranking query or a filtering query.

In another embodiment of the foregoing method, the graph neighborhood query comprises a query to determine one of: immediate children index configurations of the recommended index configuration; an immediate child index configuration of the recommended index configuration having the lowest estimated cost; sibling index configurations of the recommended index configuration; a sibling index configuration of the recommended index configuration having the lowest estimated cost; immediate parent index configurations of the recommended index configuration; or an immediate parent index configuration of the recommended index configuration having the lowest estimated cost.

In one embodiment of the foregoing method, the graph path query comprises a query to determine one of: a search path through the hierarchical graph that comprises the index configurations found at each hierarchical level of the hierarchical graph that have the lowest estimated cost; or a search path through the hierarchical graph that comprises the index configurations of a predetermined number of preceding hierarchical levels of the hierarchical graph that have the lowest estimated cost.

In an embodiment of the foregoing method, the ranking query comprises a query to determine one of: ranks of immediate children index configurations of the recommended index configuration, the rank of each immediate child index configuration corresponding to an estimated or actual cost of the respective index configuration; ranks of sibling index configurations of the recommended index configuration, the rank of each sibling index configuration corresponding to an estimated or actual cost of the respective index configuration; or ranks of immediate parent index configurations of the recommended index configuration, the rank of each immediate parent index configuration corresponding to an estimated or actual cost of the respective index configuration.

In another embodiment of the foregoing method, the filtering query comprises a query to determine one of: index configurations of the pruned graph having an estimated cost within a first predetermined range of the estimated cost of the recommended index configuration; or index configurations of the pruned graph having an estimated cost within a second predetermined range of the estimated cost of the recommended index configuration, and having no more than a predetermined number of indexes.

In one embodiment of the foregoing method, the lowest estimated cost is estimated according to a cost-based model, and performing an optimization operation based on the graph query result comprises one of: detecting that an estimated cost of an index configuration different than the recommended index configuration is less than the lowest estimated cost of the recommended index configuration and selecting the different index configuration in response thereto; detecting that the lowest estimated cost differs from a determined actual cost for the recommended index configuration by a predetermined amount and modifying the cost-based model in response thereto; and detecting that the first physical data layout is sub-optimal and reorganizing the first physical data layout into a second physical data layout in response thereto.

In an embodiment of the foregoing method, the method further comprises:

building the candidate indexes corresponding to the recommended index configuration or the selected different index configuration to provide built indexes; receiving a workload query; generating for the workload query a query plan configured to use at least one of the built indexes; and executing the query plan to generate a final query result.

A distributed query processing workload optimization system configured to receive a workload comprising a plurality of queries is provided herein, the system comprising: one or more processors; and one or more memory devices accessible to the one or more processors, the one or more memory devices storing program code for execution by the one or more processors, the program code including: a query processor, a candidate index generator, an index recommender and an index recommendation explorer, wherein: the candidate index generator is configured to generate a set of candidate indexes based on the plurality of queries; the index recommender is configured to receive the set of candidate indexes and: enumerate index configurations based of the set of candidate indexes, each index configuration comprising a subset of the set of candidate indexes; generate a hierarchical graph of the index configurations; and search the hierarchical graph for a recommended index configuration comprising an index configuration with a lowest estimated cost while pruning index configurations not considered from the graph of index configurations to generate a pruned graph; and the index recommendation explorer configured to: accept the recommended index configuration and pruned graph; execute a graph query against the pruned graph generating a graph query result; and perform an optimization operation based on the graph query result.

In an embodiment of the foregoing system, the graph query comprises one of: a graph neighborhood query, a graph path query, a ranking query or a filtering query.

In one embodiment of the foregoing system, the graph neighborhood query comprises a query to determine one of: immediate children index configurations of the recommended index configuration; an immediate child index configuration of the recommended index configuration having the lowest estimated cost; sibling index configurations of the recommended index configuration; a sibling index configuration of the recommended index configuration having the lowest estimated cost; immediate parent index configurations of the recommended index configuration; or an immediate parent index configuration of the recommended index configuration having the lowest estimated cost.

In another embodiment of the foregoing system, the graph path query comprises a query to determine one of: a search path through the hierarchical graph that comprises the index configurations found at each hierarchical level of the hierarchical graph that have the lowest estimated cost; or a search path through the hierarchical graph that comprises the index configurations of a predetermined number of preceding hierarchical levels of the hierarchical graph that have the lowest estimated cost.

In an embodiment of the foregoing system, the ranking query comprises a query to determine one of: ranks of immediate children index configurations of the recommended index configuration, the rank of each immediate child index configuration corresponding to an estimated or actual cost of the respective index configuration; ranks of sibling index configurations of the recommended index configuration, the rank of each sibling index configuration corresponding to an estimated or actual cost of the respective index configuration; or ranks of immediate parent index configurations of the recommended index configuration, the rank of each immediate parent index configuration corresponding to an estimated or actual cost of the respective index configuration.

In another embodiment of the foregoing system, the filtering query comprises a query to determine one of: index configurations of the pruned graph having an estimated cost within a first predetermined range of the estimated cost of the recommended index configuration; or index configurations of the pruned graph having an estimated cost within a second predetermined range of the estimated cost of the recommended index configuration, and having no more than a predetermined number of indexes.

In yet another embodiment of the foregoing system, the lowest estimated cost is estimated according to a cost-based model, and wherein the index recommendation explorer is configured to perform the optimization operation based on the graph query result by performing one of: detecting that an estimated cost of an index configuration different than the recommended index configuration is less than the lowest estimated cost of the recommended index configuration and selecting the different index configuration in response thereto; detecting that the lowest estimated cost differs from a determined actual cost for the recommended index configuration by a predetermined amount and modifying the cost-based model in response thereto; and detecting that the first physical data layout is sub-optimal and reorganizing the first physical data layout into a second physical data layout in response thereto.

In another embodiment of the foregoing system, the query processor is configured to: accept the recommended index configuration or the selected different index configuration; build the candidate indexes corresponding to the recommended index configuration or the selected different index configuration to provide built indexes; receive a workload query; generate for the workload query a query plan configured to use at least one of the built indexes; and execute the query plan to generate a final query result.

A computer program product comprising a computer-readable memory device having computer program logic recorded thereon that when executed by at least one processor of a computing device causes the at least one processor to perform operations for optimizing a workload in a distributed query processing system, the operations comprising: receiving a workload comprising a plurality of queries directed at data having a first physical data layout; generating a set of candidate indexes based on the plurality of queries; enumerating index configurations based of the set of candidate indexes, each index configuration comprising a subset on the set of candidate indexes; generating a hierarchical graph of the index configurations; searching the hierarchical graph for a recommended index configuration comprising an index configuration with a lowest estimated cost while pruning index configurations not considered from the graph of index configurations to generate a pruned graph; executing a graph query against the pruned graph generating a graph query result; and performing an optimization operation based on the graph query result.

In another embodiment of the foregoing computer program product, the graph query comprises one of: a graph neighborhood query, a graph path query, a ranking query or a filtering query.

In another embodiment of the foregoing computer program product, the lowest estimated cost is estimated according to a cost-based model, and performing an optimization operation based on the graph query result comprises one of: detecting that an estimated cost of an index configuration different than the recommended index configuration is less than the lowest estimated cost of the recommended index configuration and selecting the different index configuration in response thereto; detecting that lowest the estimated cost differs from a determined actual cost for the recommended index configuration by a predetermined amount and modifying the cost-based model in response thereto; and detecting that the first physical data layout is sub-optimal and reorganizing the first physical data layout into a second physical data layout in response thereto.

In another embodiment of the foregoing computer program product, said operations further comprise: building the candidate indexes corresponding to the recommended index configuration or the selected different index configuration to provide built indexes; receiving a workload query; generating for the workload query a query plan configured to use at least one of the built indexes; and executing the query plan to generate a final query result.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A distributed query processing system workload optimization method, comprising:
    receiving a workload comprising a plurality of queries directed at data having a first physical data layout;
    generating a set of candidate indexes based on the plurality of queries;
    enumerating index configurations based on the set of candidate indexes, each index configuration comprising a subset of the set of candidate indexes;
    generating a hierarchical graph of the index configurations;
    searching the hierarchical graph for a recommended index configuration comprising an index configuration with a lowest estimated cost while pruning index configurations not considered from the graph of index configurations to generate a pruned graph;
    executing a graph query against the pruned graph generating a graph query result; and
    performing an optimization operation based on the graph query result.

2. The distributed query processing system workload optimization method of claim 1, wherein the graph query comprises one of:
    a graph neighborhood query;
    a graph path query;
    a ranking query; or
    a filtering query.

3. The distributed query processing system workload optimization method of claim 2, wherein the graph neighborhood query comprises a query to determine one of:
    immediate children index configurations of the recommended index configuration;
    an immediate child index configuration of the recommended index configuration having a lowest estimated cost;
    sibling index configurations of the recommended index configuration;
    a sibling index configuration of the recommended index configuration having a lowest estimated cost;
    immediate parent index configurations of the recommended index configuration; or
    an immediate parent index configuration of the recommended index configuration having a lowest estimated cost.

4. The distributed query processing system workload optimization method of claim 2, wherein the graph path query comprises a query to determine one of:
    a search path through the hierarchical graph that comprises index configurations found at each hierarchical level of the hierarchical graph that have a lowest estimated cost; or
    a search path through the hierarchical graph that comprises index configurations of a predetermined number of preceding hierarchical levels of the hierarchical graph that have a lowest estimated cost.

5. The distributed query processing system workload optimization method of claim 2, wherein the ranking query comprises a query to determine one of:
    ranks of immediate children index configurations of the recommended index configuration, the rank of each immediate child index configuration corresponding to an estimated or actual cost of the respective index configuration;
    ranks of sibling index configurations of the recommended index configuration, the rank of each sibling index configuration corresponding to an estimated or actual cost of the respective index configuration; or
    ranks of immediate parent index configurations of the recommended index configuration, the rank of each immediate parent index configuration corresponding to an estimated or actual cost of the respective index configuration.

6. The distributed query processing system workload optimization method of claim 2, wherein the filtering query comprises a query to determine one of:
    index configurations of the pruned graph having an estimated cost within a first predetermined range of the estimated cost of the recommended index configuration; or
    index configurations of the pruned graph having an estimated cost within a second predetermined range of the estimated cost of the recommended index configuration, and having no more than a predetermined number of indexes.

7. The distributed query processing system workload optimization method of claim 1 wherein the lowest estimated cost is estimated according to a cost-based model, and performing an optimization operation based on the graph query result comprises one of:
    detecting that an estimated cost of an index configuration different than the recommended index configuration is less than the lowest estimated cost of the recommended index configuration and selecting the different index configuration in response thereto;
    detecting that the lowest estimated cost differs from a determined actual cost for the recommended index configuration by a predetermined amount and modifying the cost-based model in response thereto; and
    detecting that the first physical data layout is sub-optimal and reorganizing the first physical data layout into a second physical data layout in response thereto.

8. The distributed query processing system workload optimization method of claim 7 further comprising:

building candidate indexes corresponding to the recommended index configuration or the selected different index configuration to provide built indexes;
receiving a workload query;
generating for the workload query a query plan configured to use at least one of the built indexes; and
executing the query plan to generate a final query result.

9. A distributed query processing workload optimization system configured to receive a workload comprising a plurality of queries, the system comprising:
one or more processors; and
one or more memory devices accessible to the one or more processors, the one or more memory devices storing program code for execution by the one or more processors, the program code including:
a candidate index generator, an index recommender and an index recommendation explorer, wherein:
the candidate index generator is configured to generate a set of candidate indexes based on the plurality of queries;
the index recommender is configured to receive the set of candidate indexes and:
enumerate index configurations based of the set of candidate indexes, each index configuration comprising a subset of the set of candidate indexes;
generate a hierarchical graph of the index configurations; and
search the hierarchical graph for a recommended index configuration comprising an index configuration with a lowest estimated cost while pruning index configurations not considered from the graph of index configurations to generate a pruned graph; and
the index recommendation explorer configured to:
accept the recommended index configuration and pruned graph;
execute a graph query against the pruned graph generating a graph query result; and
perform an optimization operation based on the graph query result.

10. The distributed query processing system workload optimization system of claim 9, wherein the graph query comprises one of:
a graph neighborhood query;
a graph path query;
a ranking query; or
a filtering query.

11. The distributed query processing system workload optimization system of claim 10, wherein the graph neighborhood query comprises a query to determine one of:
immediate children index configurations of the recommended index configuration;
an immediate child index configuration of the recommended index configuration having a lowest estimated cost;
sibling index configurations of the recommended index configuration;
a sibling index configuration of the recommended index configuration having a lowest estimated cost;
immediate parent index configurations of the recommended index configuration; or
an immediate parent index configuration of the recommended index configuration having a lowest estimated cost.

12. The distributed query processing system workload optimization system of claim 10, wherein the graph path query comprises a query to determine one of:

a search path through the hierarchical graph that comprises index configurations found at each hierarchical level of the hierarchical graph that have a lowest estimated cost; or
a search path through the hierarchical graph that comprises index configurations of a predetermined number of preceding hierarchical levels of the hierarchical graph that have a lowest estimated cost.

13. The distributed query processing system workload optimization system of claim 10, wherein the ranking query comprises a query to determine one of:
ranks of immediate children index configurations of the recommended index configuration, the rank of each immediate child index configuration corresponding to an estimated or actual cost of the respective index configuration;
ranks of sibling index configurations of the recommended index configuration, the rank of each sibling index configuration corresponding to an estimated or actual cost of the respective index configuration; or
ranks of immediate parent index configurations of the recommended index configuration, the rank of each immediate parent index configuration corresponding to an estimated or actual cost of the respective index configuration.

14. The distributed query processing system workload optimization system of claim 10, wherein the filtering query comprises a query to determine one of:
index configurations of the pruned graph having an estimated cost within a first predetermined range of the estimated cost of the recommended index configuration; or
index configurations of the pruned graph having an estimated cost within a second predetermined range of the estimated cost of the recommended index configuration, and having no more than a predetermined number of indexes.

15. The distributed query processing system workload optimization system of claim 9 wherein the lowest estimated cost is estimated according to a cost-based model, and wherein the index recommendation explorer is configured to perform the optimization operation based on the graph query result by performing one of:
detecting that an estimated cost of an index configuration different than the recommended index configuration is less than the lowest estimated cost of the recommended index configuration and selecting the different index configuration in response thereto;
detecting that the lowest estimated cost differs from a determined actual cost for the recommended index configuration by a predetermined amount and modifying the cost-based model in response thereto; and
detecting that the first physical data layout is sub-optimal and reorganizing the first physical data layout into a second physical data layout in response thereto.

16. The distributed query processing system workload optimization system of claim 15 wherein the program code further comprises a query processor that is configured to:
accept the recommended index configuration or the selected different index configuration;
build candidate indexes corresponding to the recommended index configuration or the selected different index configuration to provide built indexes;
receive a workload query;
generate for the workload query a query plan configured to use at least one of the built indexes; and
execute the query plan to generate a final query result.

17. A computer program product comprising a computer-readable memory device having computer program logic recorded thereon that when executed by at least one processor of a computing device causes the at least one processor to perform operations for optimizing a workload in a distributed query processing system, the operations comprising:

receiving a workload comprising a plurality of queries directed at data having a first physical data layout;

generating a set of candidate indexes based on the plurality of queries;

enumerating index configurations based of the set of candidate indexes, each index configuration comprising a subset on the set of candidate indexes;

generating a hierarchical graph of the index configurations;

searching the hierarchical graph for a recommended index configuration comprising an index configuration with a lowest estimated cost while pruning index configurations not considered from the graph of index configurations to generate a pruned graph;

executing a graph query against the pruned graph generating a graph query result; and performing an optimization operation based on the graph query result.

18. The computer program product of claim 17, wherein the graph query comprises one of:

a graph neighborhood query;

a graph path query;

a ranking query; or a filtering query.

19. The computer program product of claim 17 wherein the lowest estimated cost is estimated according to a cost-based model, and performing an optimization operation based on the graph query result comprises one of:

detecting that an estimated cost of an index configuration different than the recommended index configuration is less than the lowest estimated cost of the recommended index configuration and selecting the different index configuration in response thereto;

detecting that lowest the estimated cost differs from a determined actual cost for the recommended index configuration by a predetermined amount and modifying the cost-based model in response thereto; and detecting that the first physical data layout is sub-optimal and reorganizing the first physical data layout into a second physical data layout in response thereto.

20. The computer program product of claim 19, wherein said operations further comprise:

building candidate indexes corresponding to the recommended index configuration or the selected different index configuration to provide built indexes;

receiving a workload query;

generating for the workload query a query plan configured to use at least one of the built indexes; and executing the query plan to generate a final query result.

* * * * *